(12) United States Patent
Hughes

(10) Patent No.: US 10,257,082 B2
(45) Date of Patent: Apr. 9, 2019

(54) MULTI-LEVEL LEARNING FOR CLASSIFYING TRAFFIC FLOWS

(71) Applicant: Silver Peak Systems, Inc., Santa Clara, CA (US)

(72) Inventor: David Anthony Hughes, Los Altos Hills, CA (US)

(73) Assignee: Silver Peak Systems, Inc., Santa Clara, CA (US)

( * ) Notice: Subject to any disclaimer, the term of this patent is extended or adjusted under 35 U.S.C. 154(b) by 83 days.

(21) Appl. No.: 15/425,798

(22) Filed: Feb. 6, 2017

(65) Prior Publication Data

US 2018/0227223 A1 Aug. 9, 2018

(51) Int. Cl.
*H04L 12/28* (2006.01)
*H04L 12/721* (2013.01)
*H04L 29/06* (2006.01)

(52) U.S. Cl.
CPC .............. *H04L 45/34* (2013.01); *H04L 69/22* (2013.01)

(58) Field of Classification Search
CPC ................................ H04L 45/34; H04L 69/22
See application file for complete search history.

(56) References Cited

U.S. PATENT DOCUMENTS

| | | |
|---|---|---|
| 4,494,108 A | 1/1985 | Langdon, Jr. et al. |
| 4,558,302 A | 12/1985 | Welch |
| 4,612,532 A | 9/1986 | Bacon et al. |
| 5,023,611 A | 6/1991 | Chamzas et al. |
| 5,159,452 A | 10/1992 | Kinoshita et al. |
| 5,243,341 A | 9/1993 | Seroussi et al. |
| 5,307,413 A | 4/1994 | Denzer |
| 5,357,250 A | 10/1994 | Healey et al. |
| 5,359,720 A | 10/1994 | Tamura et al. |
| 5,373,290 A | 12/1994 | Lempel et al. |
| 5,483,556 A | 1/1996 | Pillan et al. |
| 5,532,693 A | 7/1996 | Winters et al. |
| 5,592,613 A | 1/1997 | Miyazawa et al. |
| 5,602,831 A | 2/1997 | Gaskill |
| 5,608,540 A | 3/1997 | Ogawa |
| 5,611,049 A | 3/1997 | Pitts |
| 5,627,533 A | 5/1997 | Clark |
| 5,635,932 A | 6/1997 | Shinagawa et al. |

(Continued)

FOREIGN PATENT DOCUMENTS

| | | |
|---|---|---|
| EP | 1507353 A2 | 2/2005 |
| JP | H05-061964 | 3/1993 |
| WO | WO0135226 A1 | 5/2001 |

OTHER PUBLICATIONS

Request for Trial Granted, dated Jan. 2, 2014, U.S. Appl. No. 11/202,697, filed Aug. 12, 2005.

(Continued)

*Primary Examiner* — Clemence S Han
(74) *Attorney, Agent, or Firm* — Carr & Ferrell LLP

(57) ABSTRACT

Disclosed herein are systems and methods for multi-level classification of data traffic flows. In exemplary embodiments of the present disclosure, flows can be classified based on information in a first packet. The classification is based on an inference that can be made by a network appliance from a learning algorithm regarding an application name and/or one or more application characteristic tags. Based on the inference, the network appliance can select an appropriate network path for the flow.

20 Claims, 13 Drawing Sheets

(56) References Cited

U.S. PATENT DOCUMENTS

| | | |
|---|---|---|
| 5,652,581 A | 7/1997 | Furlan et al. |
| 5,659,737 A | 8/1997 | Matsuda |
| 5,675,587 A | 10/1997 | Okuyama et al. |
| 5,710,562 A | 1/1998 | Gormish et al. |
| 5,748,122 A | 5/1998 | Shinagawa et al. |
| 5,754,774 A | 5/1998 | Bittinger et al. |
| 5,802,106 A | 9/1998 | Packer |
| 5,805,822 A | 9/1998 | Long et al. |
| 5,883,891 A | 3/1999 | Williams et al. |
| 5,903,230 A | 5/1999 | Masenas |
| 5,955,976 A | 9/1999 | Heath |
| 6,000,053 A | 12/1999 | Levine et al. |
| 6,003,087 A | 12/1999 | Housel, III et al. |
| 6,054,943 A | 4/2000 | Lawrence |
| 6,081,883 A | 6/2000 | Popelka et al. |
| 6,084,855 A | 7/2000 | Soirinsuo et al. |
| 6,175,944 B1 | 1/2001 | Urbanke et al. |
| 6,191,710 B1 | 2/2001 | Waletzki |
| 6,240,463 B1 | 5/2001 | Benmohamed et al. |
| 6,295,541 B1 | 9/2001 | Bodnar et al. |
| 6,308,148 B1 | 10/2001 | Bruins et al. |
| 6,311,260 B1 | 10/2001 | Stone et al. |
| 6,339,616 B1 | 1/2002 | Kovalev |
| 6,374,266 B1 | 4/2002 | Shnelvar |
| 6,434,191 B1 | 8/2002 | Agrawal et al. |
| 6,434,641 B1 | 8/2002 | Haupt et al. |
| 6,434,662 B1 | 8/2002 | Greene et al. |
| 6,438,664 B1 | 8/2002 | McGrath et al. |
| 6,452,915 B1 | 9/2002 | Jorgensen |
| 6,463,001 B1 | 10/2002 | Williams |
| 6,489,902 B2 | 12/2002 | Heath |
| 6,493,698 B1 | 12/2002 | Beylin |
| 6,570,511 B1 | 5/2003 | Cooper |
| 6,587,985 B1 | 7/2003 | Fukushima et al. |
| 6,614,368 B1 | 9/2003 | Cooper |
| 6,618,397 B1 | 9/2003 | Huang |
| 6,633,953 B2 | 10/2003 | Stark |
| 6,643,259 B1 | 11/2003 | Borella et al. |
| 6,650,644 B1 | 11/2003 | Colley et al. |
| 6,653,954 B2 | 11/2003 | Rijavec |
| 6,667,700 B1 | 12/2003 | McCanne et al. |
| 6,674,769 B1 | 1/2004 | Viswanath |
| 6,718,361 B1 | 4/2004 | Basani et al. |
| 6,728,840 B1 | 4/2004 | Shatil et al. |
| 6,738,379 B1 | 5/2004 | Balazinski et al. |
| 6,754,181 B1 | 6/2004 | Elliott et al. |
| 6,769,048 B2 | 7/2004 | Goldberg et al. |
| 6,791,945 B1 | 9/2004 | Levenson et al. |
| 6,842,424 B1 | 1/2005 | Key et al. |
| 6,856,651 B2 | 2/2005 | Singh |
| 6,859,842 B1 | 2/2005 | Nakamichi et al. |
| 6,862,602 B2 | 3/2005 | Guha |
| 6,910,106 B2 | 6/2005 | Sechrest et al. |
| 6,963,980 B1 | 11/2005 | Mattsson |
| 6,968,374 B2 | 11/2005 | Lemieux et al. |
| 6,978,384 B1 | 12/2005 | Milliken |
| 7,007,044 B1 | 2/2006 | Rafert et al. |
| 7,020,750 B2 | 3/2006 | Thiyagaranjan et al. |
| 7,035,214 B1 | 4/2006 | Seddigh et al. |
| 7,047,281 B1 | 5/2006 | Kausik |
| 7,069,268 B1 | 6/2006 | Burns et al. |
| 7,069,342 B1 | 6/2006 | Biederman |
| 7,110,407 B1 | 9/2006 | Khanna |
| 7,111,005 B1 | 9/2006 | Wessman |
| 7,113,962 B1 | 9/2006 | Kee et al. |
| 7,120,666 B2 | 10/2006 | McCanne et al. |
| 7,145,889 B1 | 12/2006 | Zhang et al. |
| 7,149,953 B2 | 12/2006 | Cameron et al. |
| 7,177,295 B1 | 2/2007 | Sholander et al. |
| 7,197,597 B1 | 3/2007 | Scheid et al. |
| 7,200,847 B2 | 4/2007 | Straube et al. |
| 7,215,667 B1 | 5/2007 | Davis |
| 7,216,283 B2 | 5/2007 | Shen et al. |
| 7,242,681 B1 | 7/2007 | Van Bokkelen et al. |
| 7,243,094 B2 | 7/2007 | Tabellion et al. |
| 7,266,645 B2 | 9/2007 | Garg et al. |
| 7,278,016 B1 | 10/2007 | Detrick et al. |
| 7,318,100 B2 | 1/2008 | Demmer et al. |
| 7,366,829 B1 | 4/2008 | Luttrell et al. |
| 7,380,006 B2 | 5/2008 | Srinivas et al. |
| 7,383,329 B2 | 6/2008 | Erickson |
| 7,383,348 B2 | 6/2008 | Seki et al. |
| 7,388,844 B1 | 6/2008 | Brown et al. |
| 7,389,357 B2 | 6/2008 | Duffle, III et al. |
| 7,389,393 B1 | 6/2008 | Karr et al. |
| 7,417,570 B2 | 8/2008 | Srinivasan et al. |
| 7,417,991 B1 | 8/2008 | Crawford et al. |
| 7,420,992 B1 | 9/2008 | Fang et al. |
| 7,428,573 B2 | 9/2008 | McCanne et al. |
| 7,451,237 B2 | 11/2008 | Takekawa et al. |
| 7,453,379 B2 | 11/2008 | Plamondon |
| 7,454,443 B2 | 11/2008 | Ram et al. |
| 7,457,315 B1 | 11/2008 | Smith |
| 7,460,473 B1 | 12/2008 | Kodama et al. |
| 7,471,629 B2 | 12/2008 | Melpignano |
| 7,532,134 B2 | 5/2009 | Samuels et al. |
| 7,555,484 B2 | 6/2009 | Kulkarni et al. |
| 7,571,343 B1 | 8/2009 | Xiang et al. |
| 7,571,344 B2 | 8/2009 | Hughes et al. |
| 7,587,401 B2 | 9/2009 | Yeo et al. |
| 7,596,802 B2 | 9/2009 | Border et al. |
| 7,617,436 B2 | 11/2009 | Wenger et al. |
| 7,619,545 B2 | 11/2009 | Samuels et al. |
| 7,620,870 B2 | 11/2009 | Srinivasan et al. |
| 7,624,333 B2 | 11/2009 | Langner |
| 7,624,446 B1 | 11/2009 | Wilhelm |
| 7,630,295 B2 | 12/2009 | Hughes et al. |
| 7,633,942 B2 | 12/2009 | Bearden et al. |
| 7,639,700 B1 | 12/2009 | Nabhan et al. |
| 7,643,426 B1 | 1/2010 | Lee et al. |
| 7,644,230 B1 | 1/2010 | Hughes et al. |
| 7,676,554 B1 | 3/2010 | Malmskog et al. |
| 7,698,431 B1 | 4/2010 | Hughes |
| 7,702,843 B1 | 4/2010 | Chen et al. |
| 7,714,747 B2 | 5/2010 | Fallon |
| 7,746,781 B1 | 6/2010 | Xiang |
| 7,764,606 B1 | 7/2010 | Ferguson et al. |
| 7,810,155 B1 | 10/2010 | Ravi |
| 7,826,798 B2 | 11/2010 | Stephens et al. |
| 7,827,237 B2 | 11/2010 | Plamondon |
| 7,849,134 B2 | 12/2010 | McCanne et al. |
| 7,853,699 B2 | 12/2010 | Wu et al. |
| 7,873,786 B1 | 1/2011 | Singh et al. |
| 7,917,599 B1 | 3/2011 | Gopalan et al. |
| 7,925,711 B1 | 4/2011 | Gopalan et al. |
| 7,941,606 B1 | 5/2011 | Pullela et al. |
| 7,945,736 B2 | 5/2011 | Hughes et al. |
| 7,948,921 B1 | 5/2011 | Hughes et al. |
| 7,953,869 B2 | 5/2011 | Demmer et al. |
| 7,957,307 B2 | 6/2011 | Qiu et al. |
| 7,970,898 B2 | 6/2011 | Clubb et al. |
| 7,975,018 B2 | 7/2011 | Unrau et al. |
| 8,069,225 B2 | 11/2011 | McCanne et al. |
| 8,072,985 B2 | 12/2011 | Golan et al. |
| 8,090,027 B2 | 1/2012 | Schneider |
| 8,095,774 B1 | 1/2012 | Hughes et al. |
| 8,140,757 B1 | 3/2012 | Singh et al. |
| 8,171,238 B1 | 5/2012 | Hughes et al. |
| 8,209,334 B1 | 6/2012 | Doerner |
| 8,225,072 B2 | 7/2012 | Hughes et al. |
| 8,271,325 B2 | 9/2012 | Silverman et al. |
| 8,271,847 B2 | 9/2012 | Langner |
| 8,307,115 B1 | 11/2012 | Hughes |
| 8,312,226 B2 | 11/2012 | Hughes |
| 8,352,608 B1 | 1/2013 | Keagy et al. |
| 8,370,583 B2 | 2/2013 | Hughes |
| 8,386,797 B1 | 2/2013 | Danilak |
| 8,392,684 B2 | 3/2013 | Hughes |
| 8,442,052 B1 | 5/2013 | Hughes |
| 8,447,740 B1 | 5/2013 | Huang et al. |
| 8,473,714 B2 | 6/2013 | Hughes et al. |
| 8,489,562 B1 | 7/2013 | Hughes et al. |
| 8,516,158 B1 | 8/2013 | Wu et al. |
| 8,553,757 B2 | 10/2013 | Florencio et al. |

(56) References Cited

U.S. PATENT DOCUMENTS

| | | |
|---|---|---|
| 8,565,118 B2 | 10/2013 | Shukla et al. |
| 8,576,816 B2 | 11/2013 | Lamy-Bergot et al. |
| 8,595,314 B1 | 11/2013 | Hughes |
| 8,613,071 B2 | 12/2013 | Day et al. |
| 8,681,614 B1 | 3/2014 | McCanne et al. |
| 8,699,490 B2 | 4/2014 | Zheng et al. |
| 8,700,771 B1 | 4/2014 | Ramankutty et al. |
| 8,706,947 B1 | 4/2014 | Vincent |
| 8,725,988 B2 | 5/2014 | Hughes et al. |
| 8,732,423 B1 | 5/2014 | Hughes |
| 8,738,865 B1 | 5/2014 | Hughes et al. |
| 8,743,683 B1 | 6/2014 | Hughes |
| 8,755,381 B2 | 6/2014 | Hughes et al. |
| 8,775,413 B2 | 7/2014 | Brown et al. |
| 8,811,431 B2 | 8/2014 | Hughes |
| 8,843,627 B1 | 9/2014 | Baldi et al. |
| 8,850,324 B2 | 9/2014 | Clemm et al. |
| 8,885,632 B2 | 11/2014 | Hughes et al. |
| 8,891,554 B2 | 11/2014 | Biehler |
| 8,929,380 B1 | 1/2015 | Hughes et al. |
| 8,929,402 B1 | 1/2015 | Hughes |
| 8,930,650 B1 | 1/2015 | Hughes et al. |
| 9,003,541 B1 | 4/2015 | Patidar |
| 9,036,662 B1 | 5/2015 | Hughes |
| 9,054,876 B1 | 6/2015 | Yagnik |
| 9,092,342 B2 | 7/2015 | Hughes et al. |
| 9,106,530 B1 | 8/2015 | Wang |
| 9,130,991 B2 | 9/2015 | Hughes |
| 9,131,510 B2 | 9/2015 | Wang |
| 9,143,455 B1 | 9/2015 | Hughes |
| 9,152,574 B2 | 10/2015 | Hughes et al. |
| 9,171,251 B2 | 10/2015 | Camp et al. |
| 9,191,342 B2 | 11/2015 | Hughes et al. |
| 9,202,304 B1 | 12/2015 | Baenziger et al. |
| 9,253,277 B2 | 2/2016 | Hughes et al. |
| 9,306,818 B2 | 4/2016 | Aumann et al. |
| 9,307,442 B2 | 4/2016 | Bachmann et al. |
| 9,363,248 B1 | 6/2016 | Hughes |
| 9,363,309 B2 | 6/2016 | Hughes |
| 9,380,094 B2 | 6/2016 | Florencio et al. |
| 9,397,951 B1 | 7/2016 | Hughes |
| 9,438,538 B2 | 9/2016 | Hughes et al. |
| 9,549,048 B1 | 1/2017 | Hughes |
| 9,584,403 B2 | 2/2017 | Hughes et al. |
| 9,584,414 B2 | 2/2017 | Sung et al. |
| 9,613,071 B1 | 4/2017 | Hughes |
| 9,626,224 B2 | 4/2017 | Hughes et al. |
| 9,647,949 B2 | 5/2017 | Varki |
| 9,712,463 B1 | 7/2017 | Hughes et al. |
| 9,716,644 B2 * | 7/2017 | Wei ................... G06F 21/554 |
| 9,717,021 B2 | 7/2017 | Hughes et al. |
| 9,875,344 B1 | 1/2018 | Hughes et al. |
| 9,906,630 B2 | 2/2018 | Hughes |
| 9,948,496 B1 | 4/2018 | Hughes et al. |
| 9,961,010 B2 | 5/2018 | Hughes et al. |
| 9,967,056 B1 | 5/2018 | Hughes |
| 10,164,861 B2 | 12/2018 | Hughes et al. |
| 2001/0026231 A1 | 10/2001 | Satoh |
| 2001/0054084 A1 | 12/2001 | Kosmynin |
| 2002/0007413 A1 | 1/2002 | Garcia-Luna-Aceves et al. |
| 2002/0009079 A1 * | 1/2002 | Jungck ............. H04L 29/12066 370/389 |
| 2002/0010702 A1 | 1/2002 | Ajtai et al. |
| 2002/0010765 A1 | 1/2002 | Border |
| 2002/0040475 A1 | 4/2002 | Yap et al. |
| 2002/0061027 A1 | 5/2002 | Abiru et al. |
| 2002/0065998 A1 | 5/2002 | Buckland |
| 2002/0071436 A1 | 6/2002 | Border et al. |
| 2002/0078242 A1 | 6/2002 | Viswanath |
| 2002/0101822 A1 | 8/2002 | Ayyagari et al. |
| 2002/0107988 A1 | 8/2002 | Jordan |
| 2002/0116424 A1 | 8/2002 | Radermacher et al. |
| 2002/0129158 A1 | 9/2002 | Zhang et al. |
| 2002/0129260 A1 | 9/2002 | Benfield et al. |
| 2002/0131434 A1 | 9/2002 | Vukovic et al. |
| 2002/0150041 A1 | 10/2002 | Reinshmidt et al. |
| 2002/0159454 A1 | 10/2002 | Delmas |
| 2002/0163911 A1 | 11/2002 | Wee et al. |
| 2002/0169818 A1 | 11/2002 | Stewart et al. |
| 2002/0181494 A1 | 12/2002 | Rhee |
| 2002/0188871 A1 | 12/2002 | Noehring et al. |
| 2002/0194324 A1 | 12/2002 | Guha |
| 2003/0002664 A1 | 1/2003 | Anand |
| 2003/0009558 A1 | 1/2003 | Ben-Yehezkel |
| 2003/0012400 A1 | 1/2003 | McAuliffe et al. |
| 2003/0033307 A1 | 2/2003 | Davis et al. |
| 2003/0046572 A1 | 3/2003 | Newman et al. |
| 2003/0048750 A1 | 3/2003 | Kobayashi |
| 2003/0123481 A1 | 7/2003 | Neale et al. |
| 2003/0123671 A1 | 7/2003 | He et al. |
| 2003/0131079 A1 | 7/2003 | Neale et al. |
| 2003/0133568 A1 | 7/2003 | Stein et al. |
| 2003/0142658 A1 | 7/2003 | Ofuji et al. |
| 2003/0149661 A1 | 8/2003 | Mitchell et al. |
| 2003/0149869 A1 | 8/2003 | Gleichauf |
| 2003/0204619 A1 | 10/2003 | Bays |
| 2003/0214502 A1 | 11/2003 | Park et al. |
| 2003/0214954 A1 | 11/2003 | Oldak et al. |
| 2003/0233431 A1 | 12/2003 | Reddy et al. |
| 2004/0008711 A1 | 1/2004 | Lahti et al. |
| 2004/0047308 A1 | 3/2004 | Kavanagh et al. |
| 2004/0083299 A1 | 4/2004 | Dietz et al. |
| 2004/0086114 A1 | 5/2004 | Rarick |
| 2004/0088376 A1 | 5/2004 | McCanne et al. |
| 2004/0114569 A1 | 6/2004 | Naden et al. |
| 2004/0117571 A1 | 6/2004 | Chang et al. |
| 2004/0123139 A1 | 6/2004 | Aiello et al. |
| 2004/0158644 A1 | 8/2004 | Albuquerque et al. |
| 2004/0179542 A1 | 9/2004 | Murakami et al. |
| 2004/0181679 A1 | 9/2004 | Dettinger et al. |
| 2004/0199771 A1 | 10/2004 | Morten et al. |
| 2004/0202110 A1 | 10/2004 | Kim |
| 2004/0203820 A1 | 10/2004 | Billhartz |
| 2004/0205332 A1 | 10/2004 | Bouchard et al. |
| 2004/0243571 A1 | 12/2004 | Judd |
| 2004/0250027 A1 | 12/2004 | Hettinger |
| 2004/0255048 A1 | 12/2004 | Lev Ran et al. |
| 2005/0010653 A1 | 1/2005 | McCanne |
| 2005/0044270 A1 | 2/2005 | Grove et al. |
| 2005/0053094 A1 | 3/2005 | Cain et al. |
| 2005/0055372 A1 | 3/2005 | Springer, Jr. et al. |
| 2005/0055399 A1 | 3/2005 | Savchuk |
| 2005/0071453 A1 | 3/2005 | Ellis et al. |
| 2005/0091234 A1 | 4/2005 | Hsu et al. |
| 2005/0111460 A1 | 5/2005 | Sahita |
| 2005/0131939 A1 | 6/2005 | Douglis et al. |
| 2005/0132252 A1 | 6/2005 | Fifer et al. |
| 2005/0141425 A1 | 6/2005 | Foulds |
| 2005/0171937 A1 | 8/2005 | Hughes et al. |
| 2005/0177603 A1 | 8/2005 | Shavit |
| 2005/0182849 A1 | 8/2005 | Chandrayana et al. |
| 2005/0190694 A1 | 9/2005 | Ben-Nun et al. |
| 2005/0207443 A1 | 9/2005 | Kawamura et al. |
| 2005/0210151 A1 | 9/2005 | Abdo et al. |
| 2005/0220019 A1 | 10/2005 | Melpignano |
| 2005/0220097 A1 | 10/2005 | Swami et al. |
| 2005/0235119 A1 | 10/2005 | Sechrest et al. |
| 2005/0240380 A1 | 10/2005 | Jones |
| 2005/0243743 A1 | 11/2005 | Kimura |
| 2005/0243835 A1 | 11/2005 | Sharma et al. |
| 2005/0256972 A1 | 11/2005 | Cochran et al. |
| 2005/0278459 A1 | 12/2005 | Boucher et al. |
| 2005/0283355 A1 | 12/2005 | Itani et al. |
| 2005/0286526 A1 | 12/2005 | Sood et al. |
| 2006/0013210 A1 | 1/2006 | Bordogna et al. |
| 2006/0026425 A1 | 2/2006 | Douceur et al. |
| 2006/0031936 A1 | 2/2006 | Nelson et al. |
| 2006/0036901 A1 | 2/2006 | Yang et al. |
| 2006/0039354 A1 | 2/2006 | Rao et al. |
| 2006/0045096 A1 | 3/2006 | Farmer et al. |
| 2006/0059171 A1 | 3/2006 | Borthakur et al. |
| 2006/0059173 A1 | 3/2006 | Hirsch et al. |
| 2006/0117385 A1 | 6/2006 | Mester et al. |
| 2006/0136913 A1 | 6/2006 | Sameske |

(56) References Cited

U.S. PATENT DOCUMENTS

| | | |
|---|---|---|
| 2006/0143497 A1 | 6/2006 | Zohar et al. |
| 2006/0193247 A1 | 8/2006 | Naseh et al. |
| 2006/0195547 A1 | 8/2006 | Sundarrajan et al. |
| 2006/0195840 A1 | 8/2006 | Sundarrajan et al. |
| 2006/0212426 A1 | 9/2006 | Shakara et al. |
| 2006/0218390 A1 | 9/2006 | Loughran et al. |
| 2006/0227717 A1 | 10/2006 | van den Berg et al. |
| 2006/0250965 A1 | 11/2006 | Irwin |
| 2006/0268932 A1 | 11/2006 | Singh et al. |
| 2006/0280205 A1 | 12/2006 | Cho |
| 2007/0002804 A1 | 1/2007 | Xiong et al. |
| 2007/0008884 A1 | 1/2007 | Tang |
| 2007/0011424 A1 | 1/2007 | Sharma et al. |
| 2007/0038815 A1 | 2/2007 | Hughes |
| 2007/0038816 A1 | 2/2007 | Hughes et al. |
| 2007/0038858 A1 | 2/2007 | Hughes |
| 2007/0050475 A1 | 3/2007 | Hughes |
| 2007/0076693 A1 | 4/2007 | Krishnaswamy |
| 2007/0081513 A1 | 4/2007 | Torsner |
| 2007/0097874 A1 | 5/2007 | Hughes et al. |
| 2007/0110046 A1 | 5/2007 | Farrell |
| 2007/0115812 A1 | 5/2007 | Hughes |
| 2007/0127372 A1 | 6/2007 | Khan et al. |
| 2007/0130114 A1 | 6/2007 | Li et al. |
| 2007/0140129 A1 | 6/2007 | Bauer et al. |
| 2007/0150497 A1 | 6/2007 | De La Cruz et al. |
| 2007/0174428 A1 | 7/2007 | Lev Ran et al. |
| 2007/0179900 A1 | 8/2007 | Daase et al. |
| 2007/0192863 A1* | 8/2007 | Kapoor .................. G06F 9/505 726/23 |
| 2007/0195702 A1 | 8/2007 | Yuen et al. |
| 2007/0195789 A1 | 8/2007 | Yao |
| 2007/0198523 A1 | 8/2007 | Hayim |
| 2007/0226320 A1 | 9/2007 | Hager et al. |
| 2007/0237104 A1 | 10/2007 | Alon et al. |
| 2007/0244987 A1 | 10/2007 | Pedersen et al. |
| 2007/0245079 A1 | 10/2007 | Bhattacharjee et al. |
| 2007/0248084 A1 | 10/2007 | Whitehead |
| 2007/0258468 A1 | 11/2007 | Bennett |
| 2007/0263554 A1 | 11/2007 | Finn |
| 2007/0276983 A1 | 11/2007 | Zohar et al. |
| 2007/0280245 A1 | 12/2007 | Rosberg |
| 2008/0005156 A1 | 1/2008 | Edwards et al. |
| 2008/0013532 A1 | 1/2008 | Garner et al. |
| 2008/0016301 A1 | 1/2008 | Chen |
| 2008/0028467 A1 | 1/2008 | Kommareddy et al. |
| 2008/0031149 A1 | 2/2008 | Hughes et al. |
| 2008/0031240 A1 | 2/2008 | Hughes et al. |
| 2008/0071818 A1 | 3/2008 | Apanowicz et al. |
| 2008/0095060 A1 | 4/2008 | Yao |
| 2008/0133536 A1 | 6/2008 | Bjorner et al. |
| 2008/0133561 A1 | 6/2008 | Dubnicki et al. |
| 2008/0184081 A1 | 7/2008 | Hama et al. |
| 2008/0205445 A1 | 8/2008 | Kumar et al. |
| 2008/0222044 A1 | 9/2008 | Gottlieb et al. |
| 2008/0229137 A1 | 9/2008 | Samuels et al. |
| 2008/0243992 A1 | 10/2008 | Jardetzky et al. |
| 2008/0267217 A1 | 10/2008 | Colville et al. |
| 2008/0300887 A1 | 12/2008 | Chen et al. |
| 2008/0313318 A1 | 12/2008 | Vermeulen et al. |
| 2008/0320151 A1 | 12/2008 | McCanne et al. |
| 2009/0006801 A1 | 1/2009 | Shultz et al. |
| 2009/0024763 A1 | 1/2009 | Stepin et al. |
| 2009/0037448 A1 | 2/2009 | Thomas |
| 2009/0060198 A1 | 3/2009 | Little |
| 2009/0063696 A1 | 3/2009 | Wang et al. |
| 2009/0080460 A1 | 3/2009 | Kronewitter et al. |
| 2009/0089048 A1 | 4/2009 | Pouzin |
| 2009/0092137 A1 | 4/2009 | Haigh et al. |
| 2009/0100483 A1 | 4/2009 | McDowell |
| 2009/0158417 A1 | 6/2009 | Khanna et al. |
| 2009/0168786 A1 | 7/2009 | Sarkar |
| 2009/0175172 A1 | 7/2009 | Prytz et al. |
| 2009/0182864 A1 | 7/2009 | Khan et al. |
| 2009/0204961 A1 | 8/2009 | DeHaan et al. |
| 2009/0234966 A1 | 9/2009 | Samuels et al. |
| 2009/0245114 A1 | 10/2009 | Vijayaraghavan |
| 2009/0265707 A1 | 10/2009 | Goodman et al. |
| 2009/0274294 A1 | 11/2009 | Itani |
| 2009/0279550 A1 | 11/2009 | Romrell et al. |
| 2009/0281984 A1 | 11/2009 | Black |
| 2010/0005222 A1 | 1/2010 | Brant et al. |
| 2010/0011125 A1 | 1/2010 | Yang et al. |
| 2010/0020693 A1 | 1/2010 | Thakur |
| 2010/0054142 A1 | 3/2010 | Moiso et al. |
| 2010/0070605 A1 | 3/2010 | Hughes et al. |
| 2010/0077251 A1 | 3/2010 | Liu et al. |
| 2010/0082545 A1 | 4/2010 | Bhattacharjee et al. |
| 2010/0085964 A1 | 4/2010 | Weir et al. |
| 2010/0115137 A1 | 5/2010 | Kim et al. |
| 2010/0121957 A1 | 5/2010 | Roy et al. |
| 2010/0124239 A1 | 5/2010 | Hughes |
| 2010/0131957 A1 | 5/2010 | Kami |
| 2010/0150158 A1 | 6/2010 | Cathey et al. |
| 2010/0169467 A1 | 7/2010 | Shukla et al. |
| 2010/0177663 A1 | 7/2010 | Johansson et al. |
| 2010/0225658 A1 | 9/2010 | Coleman |
| 2010/0232443 A1 | 9/2010 | Pandey |
| 2010/0242106 A1 | 9/2010 | Harris et al. |
| 2010/0246584 A1 | 9/2010 | Ferguson et al. |
| 2010/0290364 A1 | 11/2010 | Black |
| 2010/0318892 A1 | 12/2010 | Teevan et al. |
| 2010/0333212 A1 | 12/2010 | Carpenter et al. |
| 2011/0002346 A1 | 1/2011 | Wu |
| 2011/0022812 A1 | 1/2011 | van der Linden et al. |
| 2011/0113472 A1 | 5/2011 | Fung et al. |
| 2011/0154169 A1 | 6/2011 | Gopal et al. |
| 2011/0154329 A1 | 6/2011 | Arcese et al. |
| 2011/0181448 A1 | 7/2011 | Koratagere |
| 2011/0219181 A1 | 9/2011 | Hughes et al. |
| 2011/0225322 A1 | 9/2011 | Demidov et al. |
| 2011/0258049 A1 | 10/2011 | Ramer et al. |
| 2011/0261828 A1 | 10/2011 | Smith |
| 2011/0276963 A1 | 11/2011 | Wu et al. |
| 2011/0299537 A1 | 12/2011 | Saraiya et al. |
| 2012/0005549 A1 | 1/2012 | Ichiki et al. |
| 2012/0036325 A1 | 2/2012 | Mashtizadeh et al. |
| 2012/0069131 A1 | 3/2012 | Abelow |
| 2012/0147894 A1 | 6/2012 | Mulligan et al. |
| 2012/0173759 A1 | 7/2012 | Agarwal et al. |
| 2012/0218130 A1 | 8/2012 | Boettcher et al. |
| 2012/0221611 A1 | 8/2012 | Watanabe et al. |
| 2012/0230345 A1 | 9/2012 | Ovsiannikov |
| 2012/0239872 A1 | 9/2012 | Hughes et al. |
| 2012/0290636 A1 | 11/2012 | Kadous et al. |
| 2013/0018722 A1 | 1/2013 | Libby |
| 2013/0018765 A1 | 1/2013 | Fork et al. |
| 2013/0031642 A1 | 1/2013 | Dwivedi et al. |
| 2013/0044751 A1 | 2/2013 | Casado et al. |
| 2013/0058354 A1 | 3/2013 | Casado et al. |
| 2013/0080619 A1 | 3/2013 | Assuncao et al. |
| 2013/0083806 A1* | 4/2013 | Suarez Fuentes .. H04L 41/0893 370/465 |
| 2013/0086236 A1 | 4/2013 | Baucke et al. |
| 2013/0094501 A1 | 4/2013 | Hughes |
| 2013/0103655 A1 | 4/2013 | Fanghaenel et al. |
| 2013/0117494 A1 | 5/2013 | Hughes et al. |
| 2013/0121209 A1 | 5/2013 | Padmanabhan et al. |
| 2013/0141259 A1 | 6/2013 | Hazarika et al. |
| 2013/0142050 A1* | 6/2013 | Luna ..................... H04W 4/18 370/241 |
| 2013/0163594 A1 | 6/2013 | Sharma et al. |
| 2013/0250951 A1 | 9/2013 | Koganti |
| 2013/0263125 A1 | 10/2013 | Shamsee et al. |
| 2013/0282970 A1 | 10/2013 | Hughes et al. |
| 2013/0325986 A1 | 12/2013 | Brady et al. |
| 2013/0343191 A1 | 12/2013 | Kim et al. |
| 2014/0052864 A1 | 2/2014 | Van Der Linden et al. |
| 2014/0075554 A1 | 3/2014 | Cooley |
| 2014/0086069 A1 | 3/2014 | Frey et al. |
| 2014/0101426 A1 | 4/2014 | Senthurpandi |
| 2014/0108360 A1 | 4/2014 | Kunath et al. |
| 2014/0114742 A1 | 4/2014 | Lamontagne et al. |
| 2014/0123213 A1 | 5/2014 | Vank et al. |

(56) References Cited

U.S. PATENT DOCUMENTS

| | | | |
|---|---|---|---|
| 2014/0181381 A1 | 6/2014 | Hughes et al. | |
| 2014/0269705 A1 | 9/2014 | DeCusatis et al. | |
| 2014/0279078 A1 | 9/2014 | Nukala et al. | |
| 2014/0321290 A1 | 10/2014 | Jin et al. | |
| 2014/0379937 A1 | 12/2014 | Hughes et al. | |
| 2015/0058488 A1* | 2/2015 | Backholm | H04L 61/1511 709/226 |
| 2015/0074291 A1 | 3/2015 | Hughes | |
| 2015/0074361 A1 | 3/2015 | Hughes et al. | |
| 2015/0078397 A1 | 3/2015 | Hughes et al. | |
| 2015/0110113 A1 | 4/2015 | Levy et al. | |
| 2015/0120663 A1 | 4/2015 | Le Scouarnec et al. | |
| 2015/0143505 A1 | 5/2015 | Border et al. | |
| 2015/0170221 A1 | 6/2015 | Shah | |
| 2015/0281099 A1 | 10/2015 | Banavalikar | |
| 2015/0281391 A1 | 10/2015 | Hughes et al. | |
| 2015/0312054 A1 | 10/2015 | Barabash et al. | |
| 2015/0334210 A1 | 11/2015 | Hughes | |
| 2016/0014051 A1 | 1/2016 | Hughes et al. | |
| 2016/0034305 A1 | 2/2016 | Shear et al. | |
| 2016/0093193 A1 | 3/2016 | Silvers et al. | |
| 2016/0218947 A1 | 7/2016 | Hughes et al. | |
| 2016/0255000 A1 | 9/2016 | Gattani et al. | |
| 2016/0255542 A1 | 9/2016 | Hughes et al. | |
| 2016/0380886 A1 | 12/2016 | Blair et al. | |
| 2017/0026467 A1 | 1/2017 | Barsness et al. | |
| 2017/0111692 A1 | 4/2017 | An et al. | |
| 2017/0149679 A1 | 5/2017 | Hughes et al. | |
| 2017/0187581 A1 | 6/2017 | Hughes et al. | |
| 2017/0359238 A1 | 12/2017 | Hughes et al. | |
| 2018/0089994 A1* | 3/2018 | Dhondse | G08G 1/0145 |
| 2018/0121634 A1 | 5/2018 | Hughes et al. | |
| 2018/0123861 A1 | 5/2018 | Hughes et al. | |
| 2018/0131711 A1* | 5/2018 | Chen | H04L 63/1425 |
| 2018/0205494 A1 | 7/2018 | Hughes | |
| 2018/0227216 A1 | 8/2018 | Hughes | |

OTHER PUBLICATIONS

Notice of Allowance, dated Oct. 23, 2012, U.S. Appl. No. 11/202,697, filed Aug. 12, 2005.
Decision on Appeal, dated Sep. 17, 2012, U.S. Appl. No. 11/202,697, filed Aug. 12, 2005.
Examiner's Answer to Appeal Brief, dated Oct. 27, 2009, U.S. Appl. No. 11/202,697, filed Aug. 12, 2005.
Final Office Action, dated Jan. 12, 2009, U.S. Appl. No. 11/202,697, filed Aug. 12, 2005.
Non-Final Office Action, dated Jul. 17, 2008, U.S. Appl. No. 11/202,697, filed Aug. 12, 2005.
Final Office Action, dated Feb. 22, 2008, U.S. Appl. No. 11/202,697, filed Aug. 12, 2005.
Non-Final Office Action, dated Aug. 24, 2007, U.S. Appl. No. 11/202,697, filed Aug. 12, 2005.
Request for Trial Granted, dated Jan. 2, 2014, U.S. Appl. No. 11/240,110, filed Sep. 29, 2005.
Notice of Allowance, dated Aug. 30, 2012, U.S. Appl. No. 11/240,110, filed Sep. 29, 2005.
Decision on Appeal, dated Jun. 28, 2012, U.S. Appl. No. 11/240,110, filed Sep. 29, 2005.
Examiner's Answer to Appeal Brief, dated Oct. 27, 2009, U.S. Appl. No. 11/240,110, filed Sep. 29, 2005.
Final Office Action, dated Jan. 5, 2009, U.S. Appl. No. 11/240,110, filed Sep. 29, 2005.
Non-Final Office Action, dated Jul. 10, 2008, U.S. Appl. No. 11/240,110, filed Sep. 29, 2005.
Final Office Action, dated Jan. 22, 2008, U.S. Appl. No. 11/240,110, filed Sep. 29, 2005.
Non-Final Office Action, dated Aug. 24, 2007, U.S. Appl. No. 11/240,110, filed Sep. 29, 2005.
Notice of Allowance, dated Apr. 28, 2009, U.S. Appl. No. 11/357,657, filed Feb. 16, 2006.
Non-Final Office Action, dated Sep. 17, 2008, U.S. Appl. No. 11/357,657, filed Feb. 16, 2006.
Notice of Allowance, dated Sep. 8, 2009, U.S. Appl. No. 11/263,755, filed Oct. 31, 2005.
Final Office Action, dated May 11, 2009, U.S. Appl. No. 11/263,755, filed Oct. 31, 2005.
Non-Final Office Action, dated Nov. 17, 2008, U.S. Appl. No. 11/263,755, filed Oct. 31, 2005.
Non-Final Office Action, dated Jul. 18, 2011, U.S. Appl. No. 11/285,816, filed Nov. 22, 2005.
Final Office Action, dated Mar. 30, 2011, U.S. Appl. No. 11/285,816, filed Nov. 22, 2005.
Non-Final Office Action, dated Oct. 13, 2010, U.S. Appl. No. 11/285,816, filed Nov. 22, 2005.
Non-Final Office Action, dated Mar. 22, 2010, U.S. Appl. No. 11/285,816, filed Nov. 22, 2005.
Non-Final Office Action, dated Oct. 20, 2009, U.S. Appl. No. 11/285,816, filed Nov. 22, 2005.
Non-Final Office Action, dated Mar. 24, 2009, U.S. Appl. No. 11/285,816, filed Nov. 22, 2005.
Non-Final Office Action, dated Sep. 26, 2008, U.S. Appl. No. 11/285,816, filed Nov. 22, 2005.
Notice of Allowance, dated Feb. 14, 2014, U.S. Appl. No. 11/498,473, filed Aug. 2, 2006.
Non-Final Office Action, dated Jul. 10, 2013, U.S. Appl. No. 11/498,473, filed Aug. 2, 2006.
Final Office Action, dated Feb. 4, 2013, U.S. Appl. No. 11/498,473, filed Aug. 2, 2006.
Non-Final Office Action, dated Sep. 13, 2012, U.S. Appl. No. 11/498,473, filed Aug. 2, 2006.
Final Office Action, dated Mar. 16, 2012, U.S. Appl. No. 11/498,473, filed Aug. 2, 2006.
Non-Final Office Action, dated Dec. 20, 2011, U.S. Appl. No. 11/498,473, filed Aug. 2, 2006.
Final Office Action, dated Aug. 12, 2011, U.S. Appl. No. 11/498,473, filed Aug. 2, 2006.
Non-Final Office Action, dated Dec. 6, 2010, U.S. Appl. No. 11/498,473, filed Aug. 2, 2006.
Advisory Action, dated Oct. 2, 2009, U.S. Appl. No. 11/498,473, filed Aug. 2, 2006.
Final Office Action, dated Aug. 7, 2009, U.S. Appl. No. 11/498,473, filed Aug. 2, 2006.
Non-Final Office Action, dated Jan. 22, 2009, U.S. Appl. No. 11/498,473, filed Aug. 2, 2006.
Notice of Allowance, dated Jun. 10, 2014, U.S. Appl. No. 11/498,491, filed Aug. 2, 2006.
Final Office Action, dated Mar. 25, 2014, U.S. Appl. No. 11/498,491, filed Aug. 2, 2006.
Non-Final Office Action, dated Oct. 9, 2013, U.S. Appl. No. 11/498,491, filed Aug. 2, 2006.
Advisory Action, dated Jul. 16, 2013, U.S. Appl. No. 11/498,491, filed Aug. 2, 2006.
Final Office Action, dated Apr. 15, 2013, U.S. Appl. No. 11/498,491, filed Aug. 2, 2006.
Non-Final Office Action, dated Sep. 25, 2012, U.S. Appl. No. 11/498,491, filed Aug. 2, 2006.
Advisory Action, dated Nov. 25, 2011, U.S. Appl. No. 11/498,491, filed Aug. 2, 2006.
Final Office Action, dated Aug. 17, 2011, U.S. Appl. No. 11/498,491, filed Aug. 2, 2006.
Non-Final Office Action, dated Jan. 4, 2011, U.S. Appl. No. 11/498,491, filed Aug. 2, 2006.
Final Office Action, dated Jul. 13, 2010, U.S. Appl. No. 11/498,491, filed Aug. 2, 2006.
Non-Final Office Action, dated Feb. 2, 2010, U.S. Appl. No. 11/498,491, filed Aug. 2, 2006.
Final Office Action, dated Sep. 1, 2009, U.S. Appl. No. 11/498,491, filed Aug. 2, 2006.
Non-Final Office Action, dated Jan. 26, 2009, U.S. Appl. No. 11/498,491, filed Aug. 2, 2006.
Notice of Allowance, dated Aug. 31, 2009, U.S. Appl. No. 11/724,800, filed Mar. 15, 2007.

(56) References Cited

OTHER PUBLICATIONS

Request for Trial Granted, dated Jun. 11, 2014, U.S. Appl. No. 11/497,026, filed Jul. 31, 2006.
Notice of Allowance, dated Dec. 26, 2012, U.S. Appl. No. 11/497,026, filed Jul. 31, 2006.
Decision on Appeal, dated Nov. 14, 2012, U.S. Appl. No. 11/497,026, filed Jul. 31, 2006.
Examiner's Answer to Appeal Brief, dated Oct. 14, 2009, U.S. Appl. No. 11/497,026, filed Jul. 31, 2006.
Final Office Action, dated Dec. 31, 2008, U.S. Appl. No. 11/497,026, filed Jul. 31, 2006.
Non-Final Office Action, dated Jul. 8, 2008, U.S. Appl. No. 11/497,026, filed Jul. 31, 2006.
Final Office Action, dated Jan. 9, 2008, U.S. Appl. No. 11/497,026, filed Jul. 31, 2006.
Non-Final Office Action, dated Aug. 24, 2007, U.S. Appl. No. 11/497,026, filed Jul. 31, 2006.
Notice of Allowance, dated Dec. 3, 2009, U.S. Appl. No. 11/796,239, filed Apr. 27, 2007.
Non-Final Office Action, dated Jun. 22, 2009, U.S. Appl. No. 11/796,239, filed Apr. 27, 2007.
Notice of Allowance, dated Jan. 16, 2014, U.S. Appl. No. 12/217,440, filed Jul. 3, 2008.
Non-Final Office Action, dated Aug. 14, 2013, U.S. Appl. No. 12/217,440, filed Jul. 3, 2008.
Advisory Action, dated Jan. 29, 2013, U.S. Appl. No. 12/217,440, filed Jul. 3, 2008.
Final Office Action, dated Nov. 20, 2012, U.S. Appl. No. 12/217,440, filed Jul. 3, 2008.
Non-Final Office Action, dated Jul. 18, 2012, U.S. Appl. No. 12/217,440, filed Jul. 3, 2008.
Advisory Action, dated Jul. 2, 2012, U.S. Appl. No. 12/217,440, filed Jul. 3, 2008.
Final Office Action, dated Apr. 18, 2012, U.S. Appl. No. 12/217,440, filed Jul. 3, 2008.
Non-Final Office Action, dated Sep. 22, 2011, U.S. Appl. No. 12/217,440, filed Jul. 3, 2008.
Final Office Action, dated Feb. 3, 2011, U.S. Appl. No. 12/217,440, filed Jul. 3, 2008.
Non-Final Office Action, dated Oct. 7, 2010, U.S. Appl. No. 12/217,440, filed Jul. 3, 2008.
Final Office Action, dated May 14, 2010, U.S. Appl. No. 12/217,440, filed Jul. 3, 2008.
Non-Final Office Action, dated Jan. 6, 2010, U.S. Appl. No. 12/217,440, filed Jul. 3, 2008.
Notice of Allowance, dated Feb. 29, 2012, U.S. Appl. No. 11/825,440, filed Jul. 5, 2007.
Non-Final Office Action, dated Dec. 30, 2011, U.S. Appl. No. 11/825,440, filed Jul. 5, 2007.
Final Office Action, dated Sep. 30, 2011, U.S. Appl. No. 11/825,440, filed Jul. 5, 2007.
Non-Final Office Action, dated May 13, 2011, U.S. Appl. No. 11/825,440, filed Jul. 5, 2007.
Final Office Action, dated Oct. 12, 2010, U.S. Appl. No. 11/825,440, filed Jul. 5, 2007.
Non-Final Office Action, dated May 24, 2010, U.S. Appl. No. 11/825,440, filed Jul. 5, 2007.
Notice of Allowance, dated Nov. 12, 2011, U.S. Appl. No. 11/825,497, filed Jul. 5, 2007.
Notice of Allowance, dated Apr. 21, 2011, U.S. Appl. No. 11/825,497, filed Jul. 5, 2007.
Final Office Action, dated Nov. 4, 2010, U.S. Appl. No. 11/825,497, filed Jul. 5, 2007.
Non-Final Office Action, dated Jun. 18, 2010, U.S. Appl. No. 11/825,497, filed Jul. 5, 2007.
Non-Final Office Action, dated Dec. 9, 2009, U.S. Appl. No. 11/825,497, filed Jul. 5, 2007.
Notice of Allowance, dated Feb. 11, 2011, U.S. Appl. No. 11/903,416, filed Sep. 20, 2007.
Final Office Action, dated May 5, 2010, U.S. Appl. No. 11/903,416, filed Sep. 20, 2007.
Non-Final Office Action, dated Jan. 26, 2010, U.S. Appl. No. 11/903,416, filed Sep. 20, 2007.
Notice of Allowance, dated May 14, 2013, U.S. Appl. No. 11/998,726, filed Nov. 30, 2007.
Non-Final Office Action, dated Nov. 6, 2012, U.S. Appl. No. 11/998,726, filed Nov. 30, 2007.
Final Office Action, dated Apr. 23, 2012, U.S. Appl. No. 11/998,726, filed Nov. 30, 2007.
Non-Final Office Action, dated Dec. 1, 2011, U.S. Appl. No. 11/998,726, filed Nov. 30, 2007.
Final Office Action, dated Oct. 13, 2011, U.S. Appl. No. 11/998,726, filed Nov. 30, 2007.
Advisory Action, dated May 23, 2011, U.S. Appl. No. 11/998,726, filed Nov. 30, 2007.
Final Office Action, dated Nov. 9, 2010, U.S. Appl. No. 11/998,726, filed Nov. 30, 2007.
Final Office Action, dated Jul. 22, 2010, U.S. Appl. No. 11/998,726, filed Nov. 30, 2007.
Non-Final Office Action, dated Feb. 3, 2010, U.S. Appl. No. 11/998,726, filed Nov. 30, 2007.
Notice of Allowance, dated Mar. 21, 2013, U.S. Appl. No. 12/070,796, filed Feb. 20, 2008.
Final Office Action, dated Feb. 1, 2013, U.S. Appl. No. 12/070,796, filed Feb. 20, 2008.
Non-Final Office Action, dated Aug. 28, 2012, U.S. Appl. No. 12/070,796, filed Feb. 20, 2008.
Final Office Action, dated Feb. 10, 2012, U.S. Appl. No. 12/070,796, filed Feb. 20, 2008.
Non-Final Office Action, dated Jul. 7, 2011, U.S. Appl. No. 12/070,796, filed Feb. 20, 2008.
Final Office Action, dated Dec. 8, 2010, U.S. Appl. No. 12/070,796, filed Feb. 20, 2008.
Non-Final Office Action, dated Jul. 21, 2010, U.S. Appl. No. 12/070,796, filed Feb. 20, 2008.
Non-Final Office Action, dated Feb. 4, 2010, U.S. Appl. No. 12/070,796, filed Feb. 20, 2008.
Notice of Allowance, dated Mar. 16, 2012, U.S. Appl. No. 12/151,839, filed May 8, 2008.
Final Office Action, dated Oct. 12, 2011, U.S. Appl. No. 12/151,839, filed May 8, 2008.
Non-Final Office Action, dated Feb. 3, 2011, U.S. Appl. No. 12/151,839, filed May 8, 2008.
Final Office Action, dated Sep. 23, 2010, U.S. Appl. No. 12/151,839, filed May 8, 2008.
Non-Final Office Action, dated Jun. 14, 2010, U.S. Appl. No. 12/151,839, filed May 8, 2008.
Notice of Allowance, dated Apr. 14, 2014, U.S. Appl. No. 12/313,618, filed Nov. 20, 2008.
Final Office Action, dated Jan. 14, 2014, U.S. Appl. No. 12/313,618, filed Nov. 20, 2008.
Non-Final Office Action, dated Jul. 1, 2013, U.S. Appl. No. 12/313,618, filed Nov. 20, 2008.
Advisory Action, dated Aug. 20, 2012, U.S. Appl. No. 12/313,618, filed Nov. 20, 2008.
Final Office Action, dated May 25, 2012, U.S. Appl. No. 12/313,618, filed Nov. 20, 2008.
Non-Final Office Action, dated Oct. 4, 2011, U.S. Appl. No. 12/313,618, filed Nov. 20, 2008.
Non-Final Office Action, dated Mar. 8, 2011, U.S. Appl. No. 12/313,618, filed Nov. 20, 2008.
Non-Final Office Action, dated Aug. 12, 2010, U.S. Appl. No. 12/313,618, filed Nov. 20, 2008.
Notice of Allowance, dated Jan. 20, 2011, U.S. Appl. No. 12/622,324, filed Nov. 19, 2009.
Notice of Allowance, dated Dec. 9, 2010, U.S. Appl. No. 12/622,324, filed Nov. 19, 2009.
Non-Final Office Action, dated Jun. 17, 2010, U.S. Appl. No. 12/622,324, filed Nov. 19, 2009.
Notice of Allowance, dated Mar. 26, 2012, U.S. Appl. No. 13/112,936, filed May 20, 2011.

(56) References Cited

OTHER PUBLICATIONS

Final Office Action, dated Feb. 22, 2012, U.S. Appl. No. 13/112,936, filed May 20, 2011.
Non-Final Office Action, dated Sep. 27, 2011, U.S. Appl. No. 13/112,936, filed May 20, 2011.
Advisory Action, dated Dec. 3, 2013, U.S. Appl. No. 13/288,691, filed Nov. 3, 2011.
Final Office Action, dated Sep. 26, 2013, U.S. Appl. No. 13/288,691, filed Nov. 3, 2011.
Non-Final Office Action, dated May 20, 2013, U.S. Appl. No. 13/288,691, filed Nov. 3, 2011.
Non-Final Office Action, dated Jun. 13, 2014, U.S. Appl. No. 13/288,691, filed Nov. 3, 2011.
Final Office Action, dated Dec. 18, 2014, U.S. Appl. No. 13/288,691, filed Nov. 3, 2011.
Advisory Action, dated Mar. 5, 2015, U.S. Appl. No. 13/288,691, filed Nov. 3, 2011.
Non-Final Office Action, dated Jun. 2, 2015, U.S. Appl. No. 13/288,691, filed Nov. 3, 2011.
Final Office Action, dated Jan. 11, 2016, U.S. Appl. No. 13/288,691, filed Nov. 3, 2011.
Final Office Action, dated Apr. 1, 2014, U.S. Appl. No. 13/274,162, filed Oct. 14, 2011.
Non-Final Office Action, dated Oct. 22, 2013, U.S. Appl. No. 13/274,162, filed Oct. 14, 2011.
Advisory Action, dated Jun. 27, 2014, U.S. Appl. No. 13/274,162, filed Oct. 14, 2011.
Non-Final Office Action, dated Jul. 30, 2014, U.S. Appl. No. 13/274,162, filed Oct. 14, 2011.
Final Office Action, dated Jan. 12, 2015, U.S. Appl. No. 13/274,162, filed Oct. 14, 2011.
Advisory Action, dated Mar. 25, 2015, U.S. Appl. No. 13/274,162, filed Oct. 14, 2011.
Notice of Allowance, dated May 21, 2015, U.S. Appl. No. 13/274,162, filed Oct. 14, 2011.
Notice of Allowance, dated Jan. 2, 2014, U.S. Appl. No. 13/427,422, filed Mar. 22, 2012.
Advisory Action, dated Sep. 27, 2013, U.S. Appl. No. 13/427,422, filed Mar. 22, 2012.
Final Office Action, dated Jul. 17, 2013, U.S. Appl. No. 13/427,422, filed Mar. 22, 2012.
Non-Final Office Action, dated Apr. 2, 2013, U.S. Appl. No. 13/427,422, filed Mar. 22, 2012.
Advisory Action, dated Jan. 24, 2013, U.S. Appl. No. 13/427,422, filed Mar. 22, 2012.
Final Office Action, dated Nov. 2, 2012, U.S. Appl. No. 13/427,422, filed Mar. 22, 2012.
Non-Final Office Action, dated Jul. 5, 2012, U.S. Appl. No. 13/427,422, filed Mar. 22, 2012.
Notice of Allowance, dated Feb. 19, 2013, U.S. Appl. No. 13/482,321, filed May 29, 2012.
Non-Final Office Action, dated Jan. 3, 2013, U.S. Appl. No. 13/482,321, filed May 29, 2012.
Notice of Allowance, dated Sep. 26, 2013, U.S. Appl. No. 13/517,575, filed Jun. 13, 2012.
Advisory Action, dated Apr. 4, 2013, U.S. Appl. No. 13/517,575, filed Jun. 13, 2012.
Final Office Action, dated Jan. 11, 2013, U.S. Appl. No. 13/517,575, filed Jun. 13, 2012.
Non-Final Office Action, dated Sep. 20, 2012, U.S. Appl. No. 13/517,575, filed Jun. 13, 2012.
Notice of Allowance, dated Sep. 12, 2014, U.S. Appl. No. 13/657,733, filed Oct. 22, 2012.
Supplemental Notice of Allowability, dated Oct. 9, 2014, U.S. Appl. No. 13/657,733, filed Oct. 22, 2012.
Notice of Allowance, dated Jan. 3, 2014, U.S. Appl. No. 13/757,548, filed Feb. 1, 2013.
Non-Final Office Action, dated Sep. 10, 2013, U.S. Appl. No. 13/757,548, filed Feb. 1, 2013.
Notice of Allowance, dated Nov. 25, 2013, U.S. Appl. No. 13/917,517, filed Jun. 13, 2013.
Non-Final Office Action, dated Aug. 14, 2013, U.S. Appl. No. 13/917,517, filed Jun. 13, 2013.
Non-Final Office Action, dated Jun. 6, 2014, U.S. Appl. No. 14/190,940, filed Feb. 26, 2014.
Non-Final Office Action, dated Oct. 1, 2014, U.S. Appl. No. 14/190,940, filed Feb. 26, 2014.
Notice of Allowance, dated Mar. 16, 2015, U.S. Appl. No. 14/190,940, filed Feb. 26, 2014.
Notice of Allowance, dated Sep. 5, 2014, U.S. Appl. No. 14/248,229, filed Apr. 8, 2014.
Non-Final Office Action, dated Jun. 8, 2015, U.S. Appl. No. 14/248,167, filed Apr. 8, 2014.
Non-Final Office Action, dated Jul. 11, 2014, U.S. Appl. No. 14/248,188, filed Apr. 8, 2014.
Notice of Allowance, dated Jan. 23, 2015, U.S. Appl. No. 14/248,188, filed Apr. 8, 2014.
Corrected Notice of Allowability, dated Aug. 5, 2015, U.S. Appl. No. 14/248,188, filed Apr. 8, 2014.
Notice of Allowance, dated Oct. 6, 2014, U.S. Appl. No. 14/270,101, filed May 5, 2014.
Non-Final Office Action, dated Nov. 26, 2014, U.S. Appl. No. 14/333,486, filed Jul. 16, 2014.
Notice of Allowance, dated Dec. 22, 2014, U.S. Appl. No. 14/333,486, filed Jul. 16, 2014.
Non-Final Office Action, dated Dec. 31, 2014, U.S. Appl. No. 13/621,534, filed Sep. 17, 2012.
Non-Final Office Action, dated Jan. 23, 2015, U.S. Appl. No. 14/548,195, filed Nov. 19, 2014.
Notice of Allowance, dated Jun. 3, 2015, U.S. Appl. No. 14/548,195, filed Nov. 19, 2014.
Non-Final Office Action, dated Mar. 11, 2015, U.S. Appl. No. 14/549,425, filed Nov. 20, 2014.
Notice of Allowance, dated Jul. 27, 2015, U.S. Appl. No. 14/549,425, filed Nov. 20, 2014.
Non-Final Office Action, dated May 6, 2015, U.S. Appl. No. 14/477,804, filed Sep. 4, 2014.
Final Office Action, dated Sep. 18, 2015, U.S. Appl. No. 14/477,804, filed Sep. 4, 2014.
Non-Final Office Action, dated May 18, 2015, U.S. Appl. No. 14/679,965, filed Apr. 6, 2015.
Final Office Action, dated Dec. 21, 2015, U.S. Appl. No. 14/679,965, filed Apr. 6, 2015.
Final Office Action, dated Jul. 14, 2015, U.S. Appl. No. 13/621,534, filed Sep. 17, 2012.
Non-Final Office Action, dated Jul. 15, 2015, U.S. Appl. No. 14/734,949, filed Jun. 9, 2015.
Non-Final Office Action, dated Aug. 11, 2015, U.S. Appl. No. 14/677,841, filed Apr. 2, 2015.
Non-Final Office Action, dated Aug. 18, 2015, U.S. Appl. No. 14/543,781, filed Nov. 17, 2014.
Notice of Allowance, dated Oct. 5, 2015, U.S. Appl. No. 14/734,949, filed Jun. 9, 2015.
Advisory Action, dated Nov. 25, 2015, U.S. Appl. No. 13/621,534, filed Sep. 17, 2012.
Non-Final Office Action, dated Dec. 15, 2015, U.S. Appl. No. 14/479,131, filed Sep. 5, 2014.
Non-Final Office Action, dated Dec. 16, 2015, U.S. Appl. No. 14/859,179, filed Sep. 18, 2015.
Non-Final Office Action, dated Jan. 12, 2016, U.S. Appl. No. 14/477,804, filed Sep. 4, 2014.
Notice of Allowance, dated Feb. 8, 2016, U.S. Appl. No. 14/543,781, filed Nov. 17, 2014.
Corrected Notice of Allowability, dated Mar. 7, 2016, U.S. Appl. No. 14/543,781, filed Nov. 17, 2014.
Notice of Allowance, dated Feb. 16, 2016, U.S. Appl. No. 14/248,167, filed Apr. 8, 2014.
Notice of Allowance, dated Mar. 2, 2016, U.S. Appl. No. 14/677,841, filed Apr. 2, 2015.
Corrected Notice of Allowability, dated Mar. 14, 2016, U.S. Appl. No. 14/677,841, filed Apr. 2, 2015.

(56) References Cited

OTHER PUBLICATIONS

Advisory Action, dated Mar. 21, 2016, U.S. Appl. No. 14/679,965, filed Apr. 6, 2015.
Non-Final Office Action, dated May 3, 2016, U.S. Appl. No. 14/679,965, filed Apr. 6, 2015.
Non-Final Office Action, dated May 6, 2016, U.S. Appl. No. 13/288,691, filed Nov. 3, 2011.
Notice of Allowance, dated Jun. 3, 2016, U.S. Appl. No. 14/859,179, filed Sep. 18, 2015.
Non-Final Office Action, dated Jun. 15, 2016, U.S. Appl. No. 15/091,533, filed Apr. 5, 2016.
Non-Final Office Action, dated Jun. 22, 2016, U.S. Appl. No. 14/447,505, filed Jul. 30, 2014.
Final Office Action, dated Jul. 19, 2016, U.S. Appl. No. 14/479,131, filed Sep. 5, 2014.
Non-Final Office Action, dated Jul. 25, 2016, U.S. Appl. No. 14/067,619, filed Oct. 30, 2013.
Final Office Action, dated Jul. 26, 2016, U.S. Appl. No. 14/477,804, filed Sep. 4, 2014.
Non-Final Office Action, dated Aug. 10, 2016, U.S. Appl. No. 15/148,933, filed May 6, 2016.
Notice of Allowance, dated Aug. 24, 2016, U.S. Appl. No. 14/679,965, filed Apr. 6, 2015.
Non-Final Office Action, dated Aug. 26, 2016, U.S. Appl. No. 13/621,534, filed Sep. 17, 2012.
Final Office Action, dated Oct. 4, 2016, U.S. Appl. No. 15/091,533, filed Apr. 5, 2016.
Non-Final Office Action, dated Oct. 6, 2016, U.S. Appl. No. 14/479,131, filed Sep. 5, 2014.
Notice of Allowance, dated Nov. 16, 2016, U.S. Appl. No. 13/288,691, filed Nov. 3, 2011.
Final Office Action, dated Nov. 21, 2016, U.S. Appl. No. 14/447,505, filed Jul. 30, 2015.
Notice of Allowance, dated Nov. 23, 2016, U.S. Appl. No. 14/067,619, filed Oct. 30, 2013.
Notice of Allowance, dated Dec. 5, 2016, U.S. Appl. No. 14/477,804, filed Sep. 4, 2014.
Advisory Action, dated Jan. 9, 2017, U.S. Appl. No. 15/091,533, filed Apr. 5, 2016.
Final Office Action, dated Feb. 17, 2017, U.S. Appl. No. 15/148,933, filed May 6, 2016.
Notice of Allowance, dated Mar. 22, 2017, U.S. Appl. No. 13/621,534, filed Sep. 17, 2012.
Notice of Allowance, dated Mar. 23, 2017, U.S. Appl. No. 15/091,533, filed Apr. 5, 2016.
Non-Final Office Action, dated Apr. 27, 2017, U.S. Appl. No. 14/447,505, filed Jul. 30, 2014.
Notice of Allowance, dated Oct. 25, 2017, U.S. Appl. No. 14/447,505, filed Jul. 30, 2014.
Final Office Action, dated May 3, 2017, U.S. Appl. No. 14/479,131, filed Sep. 5, 2014.
Notice of Allowance, dated Sep. 8, 2017, U.S. Appl. No. 14/479,131, filed Sep. 5, 2014.
Non-Final Office Action, dated May 4, 2017, U.S. Appl. No. 14/811,482, filed Jul. 28, 2015.
Notice of Allowance, dated Sep. 5, 2017, U.S. Appl. No. 14/811,482, filed Jul. 28, 2015.
Non-Final Office Action, dated Jul. 27, 2017, U.S. Appl. No. 14/981,814, filed Dec. 28, 2015.
Non-Final Office Action, dated Jun. 20, 2017, U.S. Appl. No. 15/148,933, filed May 6, 2016.
Final Office Action, dated Oct. 5, 2017, U.S. Appl. No. 15/148,933, filed May 6, 2016.
Non-Final Office Action, dated Nov. 2, 2017, U.S. Appl. No. 15/403,116, filed Jan. 10, 2017.
Non-Final Office Action, dated Sep. 11, 2017, U.S. Appl. No. 15/148,671, filed May 6, 2016.
"IPsec Anti-Replay Window: Expanding and Disabling," Cisco IOS Security Configuration Guide. 2005-2006 Cisco Systems, Inc. Last updated: Sep. 12, 2006, 14 pages.

Singh et al. ; "Future of Internet Security—IPSEC"; 2005; pp. 1-8.
Muthitacharoen, Athicha et al., "A Low-bandwidth Network File System," 2001, in Proc. of the 18th ACM Symposium on Operating Systems Principles, Banff, Canada, pp. 174-187.
"Shared LAN Cache Datasheet", 1996, <http://www.lancache.com/slcdata.htm>, 8 pages.
Spring et al., "A protocol-independent technique for eliminating redundant network traffic", ACM SIGCOMM Computer Communication Review, vol. 30, Issue 4 (Oct. 2000) pp. 87-95, Year of Publication: 2000.
"Hong, B et al. ""Duplicate data elimination in a SAN file system""", In Proceedings of the 21st Symposium on Mass Storage Systems (MSS '04), Goddard, MD, Apr. 2004. IEEE, pp. 101-114."
You, L. L. and Karamanolis, C. 2004. "Evaluation of efficient archival storage techniques", In Proceedings of the 21st IEEE Symposium on Mass Storage Systems and Technologies (MSST), pp. 1-6.
Douglis, F. et al., "Application specific Delta-encoding via Resemblance Detection", Published in the 2003 USENIX Annual Technical Conference, pp. 1-14.
You, L. L. et al., "Deep Store an Archival Storage System Architecture" Data Engineering, 2005. ICDE 2005. Proceedings of the 21st Intl. Conf. on Data Eng.,Tokyo, Japan, Apr. 5-8, 2005, pp. 12.
Manber, Udi, "Finding Similar Files in a Large File System", TR 93-33 Oct. 1994, Department of Computer Science, University of Arizona. <http://webglimpse.net/pubs/TR93-33.pdf>. Also appears in the 1994 winter USENIX Technical Conference.
Knutsson, Bjorn et al., "Transparent Proxy Signalling", Journal of Communications and Networks, vol. 3, No. 2, Jun. 2001, pp. 164-174.
Definition memory (n), Webster's Third New International Dictionary, Unabridged (1993), available at <http://lionreference.chadwyck.com> (Dictionaries/Webster's Dictionary).
Definition appliance, 2c, Webster's Third New International Dictionary, Unabridged (1993), available at <http://lionreference.chadwyck.com> (Dictionaries/Websters Dictionary).
Newton, "Newton's Telecom Dictionary", 17th Ed., 2001, pp. 38, 201, and 714.
Silver Peak Systems, "The Benefits of Byte-level WAN Deduplication" (2008), pp. 1-5.
"Business Wire, ""Silver Peak Systems Delivers Family of Appliances for Enterprise-Wide Centralization of Branch Office Infrastructure; Innovative Local Instance Networking Approach Overcomes Traditional Application Acceleration Pitfalls""" (available at http://www.businesswire.com/news/home/20050919005450/en/Silver-Peak-Systems-Delivers-Family-Appliances-Enterprise-Wide#.UVzkPk7u-1 (last visited Aug. 8, 2014))."
Riverbed, "Riverbed Introduces Market-Leading WDS Solutions for Disaster Recovery and Business Application Acceleration" (available at http://www.riverbed.com/about/news-articles/pressreleases/riverbed-introduces-market-leading-wds-solutions-fordisaster-recovery-and-business-application-acceleration.html (last visited Aug. 8, 2014)), 4 pages.
Tseng, Josh, "When accelerating secure traffic is not secure" (available at http://www.riverbed.com/blogs/whenaccelerati.html?&isSearch=true&pageSize=3&page=2 (last visited Aug. 8, 2014)), 3 pages.
Riverbed, "The Riverbed Optimization System (RiOS) v4.0: A Technical Overview" (explaining "Data Security" through segmentation) (available at http://mediacms.riverbed.com/documents/TechOverview-Riverbed-RiOS_4_0.pdf (last visited Aug. 8, 2014)), pp. 1-18.
Riverbed, "Riverbed Awarded Patent on Core WDS Technology" (available at: http://www.riverbed.com/about/news-articles/pressreleases/riverbed-awarded-patent-on-core-wds-technology.html (last visited Aug. 8, 2014)), 2 pages.
Final Written Decision, dated Dec. 30, 2014, Inter Partes Review Case No. IPR2013-00403, pp. 1-38.
Final Written Decision, dated Dec. 30, 2014, Inter Partes Review Case No. IPR2013-00402, pp. 1-37.
Final Written Decision, dated Jun. 9, 2015, Inter Partes Review Case No. IPR2014-00245, pp. 1-40.

(56) References Cited

OTHER PUBLICATIONS

"Notice of Entry of Judgement Accompanied by Opinion", United States Court of Appeals for the Federal Circuit, Case: 15-2072, Oct. 24, 2017, 6 pages.
"Decision Granting Motion to Terminate", Inter Partes Review Case No. IPR2014-00245, Feb. 7, 2018, 4 pages.

* cited by examiner

Application Definitions

|  | Dynamic Updates | User Overrides |
|---|---|---|
| IP Protocol Based... edit table | ☑ | ☑ |
| UDP Port Based... edit table | ☑ | ☑ |
| TCP Port Based... edit table | ☑ | ☑ |
| Domain / URL Based... edit table | ☑ | ☑ |
| Inference / DPI Based... edit table | ☑ | ☑ |
| ACL Based... edit table | ☑ | ☑ |

---

Find Application Definition by Name

Name _____ICMP_____

Matches:

IGMP   Protocol #2   100   Routing           Internet Group Management ...edit

Add by protocol    Add by UDP port    Add by TCP port    Add by ACL port

FIG. 9

IP Protocol Based Application Definition

| Override | Protocol# | Name | Priority (0-100) | Tags | Notes |
|---|---|---|---|---|---|
| ☐ | 0 | HOPOPT | 0 | | IPv6 Hop-by-Hop Option |
| ☐ | 1 | ICMP | 100 | | Internet Control Message |
| ☐ | 2 | IGMP | 100 | Routing | Internet Group Management |
| ☐ | 3 | GGP | 1 | | Gateway-to-Gateway |
| ☐ | 4 | IPv4 | 1 | | IPv4 encapsulation |
| ☐ | 5 | ST | 1 | | Stream |
| ☐ | 6 | TCP | 2 | | Transmission Control |
| ☐ | 7 | CBT | 1 | | CBT |
| | 8 | EGP | 100 | Routing | Exterior Gateway Protocol |
| | 9 | IGP | 100 | Routing | any private interior gateway (used by Cisco for their IGRP) |
| | 10 | BBN-RCC-MON | 1 | | BBN RCC Monitoring |
| | 11 | NVP-II | 1 | | Network Voice Protocol |
| | 12 | PUP | 1 | | PUP |
| | 13 | ARGUS (deprecated) | 1 | | ARGUS |
| | 14 | EMCON | 1 | | EMCON |
| | 15 | XNET | 1 | | Cross Net Debugger |
| | 16 | CHAOS | 1 | | Chaos |
| | 17 | UDP | 2 | | User Datagram |
| | 18 | MUX | 1 | | Multiplexing |
| | 19 | DCN-MEAS | 1 | | DCN Measurement Subsystems |
| | 20 | HMP | 1 | | Host Monitoring |
| | 21 | PRM | 1 | | Packet Radio Measurement |
| | 22 | XNS-IDP | 1 | | XEROX NS IDP |

FIG. 10

TCP Port Based Application Definition

| Override | Port#. | Name | Priority (0-100) | Tags | Notes |
|---|---|---|---|---|---|
| ☐ | 9 | discard | 1 | | Discard Protocol |
| ☐ | 11 | systat | 1 | | Active Users Protocol |
| ☐ | 13 | daytime | 1 | | Daytime Protocol |
| ☐ | 17 | qotd | 1 | | Quote Of The Day Protocol |
| ☐ | 19 | chargen | 1 | | Character Generator Protocol |
| ☐ | 20 | ftp-data | 50 | Bulk Data | File Transfer Protocol (default data port) |
| ☐ | 21 | ftp | 80 | | File Transfer Protocol (control / commands) |
| ☐ | 23 | telnet | 80 | Interactive | Telnet Protocol |
| ☐ | 25 | smtp | 80 | | Simple Mail Transfer Protocol |
| | 37 | time | 80 | | Time Protocol |
| | 43 | nicname | 1 | | Whois Protocol (also called "Nicname") |
| | 53 | domain | 90 | | Domain Name Server (Domain Name System) |
| | 67 | bootps | 1 | | Bootstrap Protocol / DHCP (Server) |
| | 68 | bootpc | 2 | | Bootstrap Protocol / DHCP (Client) |
| | 69 | tftp | 80 | Interactive | Trivial File Transfer Protocol |
| | 70 | gopher | 80 | | Gopher Protocol |
| | 79 | finger | 80 | | Finger User Information Protocol |
| | 80 | http | 50 | | Hypertext Transfer Protocol (World Wide Web) |
| | 110 | pop3 | 80 | Mail | Post Office Protocol (version 3) |
| | 119 | nntp | 50 | | Network News Transfer Protocol |
| | 123 | ntp | 1 | | Network Time Protocol |
| | 137 | netbios-ns | 1 | | NetBIOS (Name Service) |
| | 138 | netbios-dgm | 1 | | NetBIOS (Datagram Service) |
| | 139 | netbios-ssn | 1 | | NetBIOS (Session Service) |
| | 143 | imap | 2 | Mail | Internet Message Access Protocol |
| | 161 | snmp | 1 | Management | Simple Network Management Protocol |
| | 162 | snmptrap | 1 | Management | Simple Network Management Protocol (Trap) |
| | 179 | bgp | 80 | Routing | Border Gateway Protocol |
| | 194 | irc | 80 | | Internet Relay Chat |
| | 443 | https | 80 | | Hypertext Transfer Protocol over Secure Sockets Layer |

FIG. 11

Domain Based Application Definition

| Override | Match String | Name | HTTP | HTTPS | Other | Priority (0-100) | Tags | Notes |
|---|---|---|---|---|---|---|---|---|
| ☐ | *google* | google | ☑ | ☑ | ☐ | 60 | | |
| ☐ | *facebook* | facebook | ☑ | ☑ | ☐ | 60 | social | |
| ☐ | *youtube* | youtube | ☑ | ☐ | ☐ | 60 | video streaming | |
| ☐ | *skype* | skype | ☑ | ☑ | ☑ | | | |

FIG. 12

Inspection/Inference Application Definition

| Override | Detector | Name | Priority (0-100) | Tags | Notes |
|---|---|---|---|---|---|
| ☐ | CC-DPI-ftp-data | ftp-data | 80 | Bulk data | |
| ☐ | CC-DPI-h323 | h323 | 80 | voice | |
| ☐ | APP-AI-webrtc | webrtc | 80 | video streaming | |
| ☐ | FPI-skype | skype | 40 | voice | |

FIG. 13

MULTI-LEVEL LEARNING FOR CLASSIFYING TRAFFIC FLOWS

TECHNICAL FIELD

This disclosure relates generally to the classification of a network traffic flow and selection of a network path based on the classification.

BACKGROUND

The approaches described in this section could be pursued, but are not necessarily approaches that have previously been conceived or pursued. Therefore, unless otherwise indicated, it should not be assumed that any of the approaches described in this section qualify as prior art merely by virtue of their inclusion in this section.

Typically, data is sent between computing devices across a communications network in packets. The packets may be generated according to a variety of protocols such as Transmission Control Protocol (TCP), User Datagram Protocol (UDP), or the like. A network appliance in a network can be connected to many other computing devices via many different network paths. Further the network paths may traverse multiple communication networks.

When selecting a network path for a particular data traffic flow, a network appliance may first need to classify the flow to determine which network path is appropriate or optimal for the flow. The network path selection needs to be made on a first packet for a flow. However, often times a first packet for a flow is merely a packet for establishing a connection and may only have limited information, such as only header information. Thus mechanisms are needed for classifying a traffic flow based on the limited information available in a first packet for a flow.

SUMMARY

This summary is provided to introduce a selection of concepts in a simplified form that are further described in the Detailed Description below. This summary is not intended to identify key features or essential features of the claimed subject matter, nor is it intended to be used as an aid in determining the scope of the claimed subject matter.

In exemplary methods of the present disclosure, a method of selecting a network path for transmitting data across a network is presented. The method comprises receiving at a first network appliance, a first packet of a first flow to be transmitted across a network; extracting information from the first packet; using an application inference engine influenced by a learning algorithm to infer at least one of an application name and one or more application characteristic tags for the first flow based on the extracted information; selecting by the network appliance a network path based on the inferred at least one of application name and one or more application characteristic tags; and transmitting the first flow by the first network appliance via the selected network path to a destination.

In other embodiments, a method of training an inference engine to identify at least one of an application and one or more application characteristics for a flow is disclosed. The method comprises: receiving at a first network appliance, a first packet of a first flow to be transmitted across a network, wherein the network comprises a plurality of network paths; extracting information from the first packet; using an application inference engine influenced by a learning algorithm to infer at least one of an application name and one or more application characteristic tags based on the extracted information from the first packet; selecting, by the first network appliance, a network path from the plurality of network paths in the network for transmitting the first flow, the network path selected based on at least one of the inferred application name and inferred application characteristic tags; and transmitting by the first network appliance, the first flow via the selected network path to a destination.

In further embodiments, a system for inferring at least one of an application name and one or more application tags for a first packet of a flow is disclosed. The system comprises: a feature extraction engine to extract information from the first packet of the flow; an inspection engine to determine whether the extracted information is indicative of a known application name or one or more application tags; and an inference engine to infer at least one of an application name and one or more application tags for the first packet based on the extracted information.

Other features, examples, and embodiments are described below.

BRIEF DESCRIPTION OF THE DRAWINGS

Embodiments are illustrated by way of example, and not by limitation in the figures of the accompanying drawings, in which like references indicate similar elements.

FIGS. 9-13 depict exemplary mapping tables that can be used.

DETAILED DESCRIPTION

The following detailed description includes references to the accompanying drawings, which form a part of the detailed description. The drawings show illustrations, in accordance with exemplary embodiments. These exemplary embodiments, which are also referred to herein as "examples," are described in enough detail to enable those skilled in the art to practice the present subject matter. The embodiments can be combined, other embodiments can be utilized, or structural, logical, and electrical changes can be made without departing from the scope of what is claimed. The following detailed description is therefore not to be taken in a limiting sense, and the scope is defined by the appended claims and their equivalents. In this document, the terms "a" and "an" are used, as is common in patent documents, to include one or more than one. In this document, the term "or" is used to refer to a nonexclusive "or," such that "A or B" includes "A but not B," "B but not A," and "A and B," unless otherwise indicated.

The embodiments disclosed herein may be implemented using a variety of technologies. For example, the methods described herein may be implemented in software executing on a computer system containing one or more computers, or in hardware utilizing either a combination of microprocessors or other specially designed application-specific integrated circuits (ASICs), programmable logic devices, or various combinations thereof. In particular, the methods described herein may be implemented by a series of computer-executable instructions residing on a storage medium, such as a disk drive, or computer-readable medium.

The embodiments described herein relate to multi-level learning for classifying flows.

I. System Setup

Figure 1:
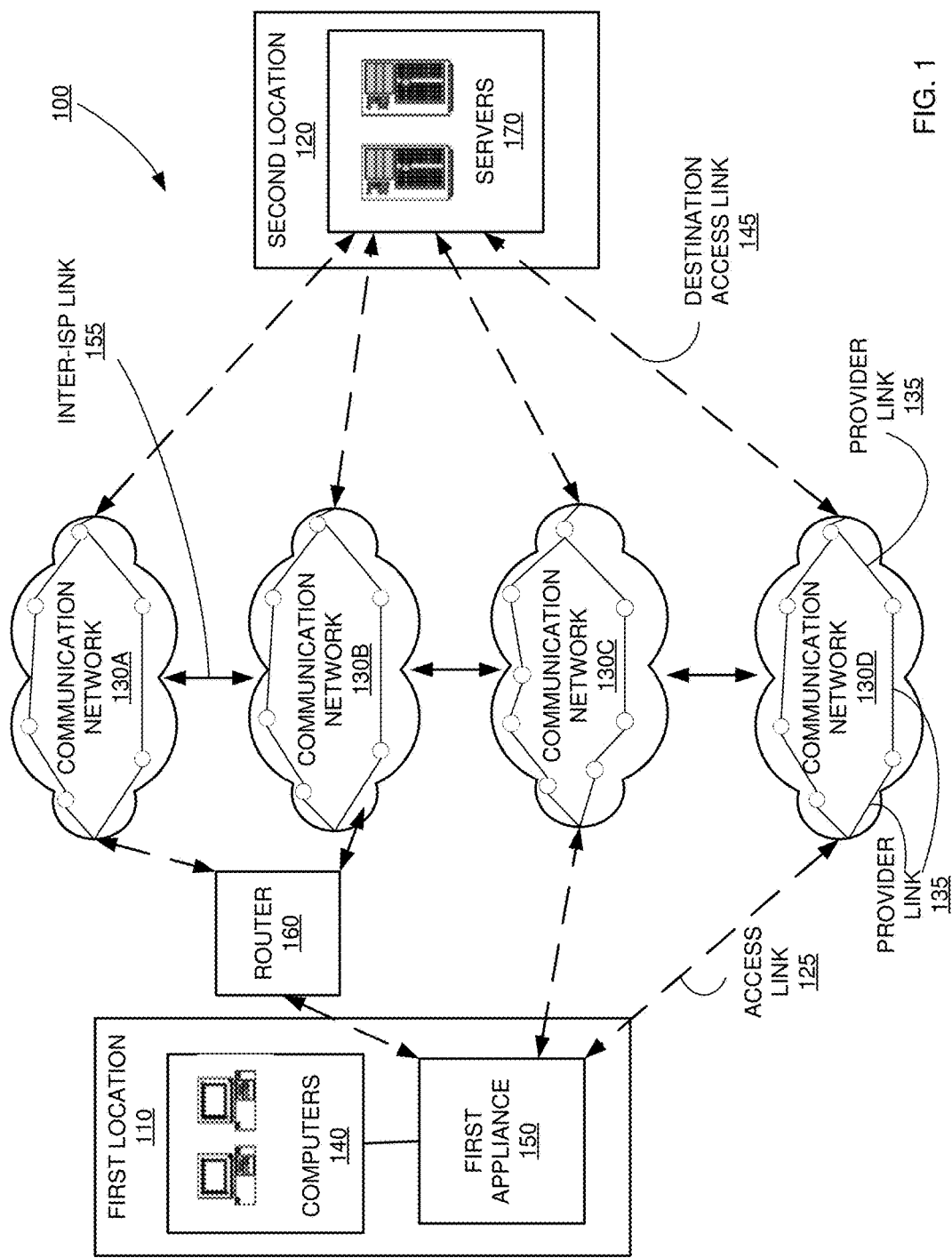
FIG. 1 depicts an exemplary system, within which the present disclosure can be implemented.

FIG. 1 illustrates an exemplary system 100, within which the present disclosure can be implemented. The exemplary system 100 includes a first location 110, a second location 120, and communication networks 130A-130D. While four communication networks are depicted in exemplary system 100, there can be any number of communication networks, including just one. Additionally, system 100 can include many locations, though only two are depicted in the exemplary figure for simplicity.

In the exemplary embodiment depicted in FIG. 1, the first location 110 includes computers 140 and a first appliance 150. In the first location 110, the computers 140 are linked to the first appliance 150. While only one appliance is depicted in first location 110, there can be multiple appliances, physical and/or virtual, at first location 110. In some embodiments, the first location is a branch location of an enterprise. While not depicted here, first location 110 can also comprise additional elements such as routers, switches, or any other physical or virtual computing equipment.

Computers 140 may be any type of computing device capable of accessing a communication network, such as a desktop computer, laptop computer, server, mobile phone, tablet, or any other "smart" device.

The first appliance 150 comprises hardware and/or software elements configured to receive data and optionally perform any type of processing before transmitting across a communication network.

As illustrated, the first appliance 150 is configured in-line (or serially) between the computers 140 and the router 160. The first appliance 150 intercepts network traffic between the computers 140 and the servers 170, in either direction.

In other embodiments, the first appliance 150 can be configured as an additional router, gateway, bridge, or be transparent on some or all interfaces. As a router, for example, the first appliance 150 appears to the computers 140 as an extra hop before the router 160. In some embodiments, the first appliance 150 provides redundant routing or peer routing with the router 160. Additionally, the first appliance 150 may provide failure mechanisms, such as, fail-to-open (e.g., no data access) or fail-to-wire (e.g., a direct connection to the router 160). If an appliance has multiple interfaces, it can be transparent on some interfaces, or act like a router, or act like a bridge on others. Alternatively, the appliance can be transparent on all interfaces, or appear as a router or bridge on all interfaces.

In FIG. 1, the first appliance 150 is linked to a router 160, which is coupled to communication networks 130A and 130B. While only one router 160 is depicted in exemplary system 100, there can be multiple routers, switches, or other equipment (physical or virtual) present in system 100, either within the first location 110 or outside of the first location 110. Typically, router 160 would be located within first location 110. In various embodiments, first appliance 150 may be in communication with communication networks 130C and 130D directly (on separate interfaces), instead of through router 160. While router 160 is depicted as being connected to two communication networks and first appliance 150 is also depicted as being connected to two communication networks, a person of ordinary skill in the art would understand that there can be any number of communication networks (including just one communication network) connected to the first location 110, either via router 160, via first appliance 150, or via another computing device. To illustrate that each of the access links is possible but not required in every embodiment, the access links 125 are shown as dashed lines in FIG. 1.

The second location 120 in exemplary system 100 includes servers 170. While the term "server" is used herein, any type of computing device may be used in second location 120, as understood by a person of ordinary skill in the art. The server may also be a virtual machine. While not depicted in FIG. 1, second location 120 can optionally include at least one second appliance in addition to, or instead of, servers 170. Second location 120 can also include other components not depicted in FIG. 1, such as routers, switches, load-balancers or any other physical or virtual computing equipment. In some embodiments, the second location 120 is a central location or data center for an enterprise. In other embodiments, the second location 120 is a data center hosting a public web service or application.

The servers 170 are depicted in FIG. 1 as being linked to the communication networks 130A-130D via destination access links 145. In some embodiments, servers 170 may actually be in communication with the one or more of the communication networks through a router, switch, second appliance, or other physical or virtual equipment. Further, while four destination access links 145 are depicted in FIG. 1, for four communication networks (130A-130D), there may actually be fewer (such as just one) or more communication networks connected to second location 120. To illustrate that each of the destination access links 145 is possible but not required in every embodiment, the destination access links 145 are shown as dashed lines in FIG. 1.

The communication networks 130A-130D comprise hardware and/or software elements that enable the exchange of information (e.g., voice, video and data) between the first location 110 and the second location 120. Some examples of the communication networks 130A-130D are a private wide-area network (WAN), the public Internet, Multiprotocol Label Switching (MPLS) network, and wireless LTE network. Typically connections from the first location 110 to the communication networks 130A-130D (e.g., from router 160 and first appliance 150) are T1 lines (1.544 Mbps), or broadband connections such as digital subscriber lines (DSL) and cable modems. Other examples are MPLS lines, T3 lines (43.232 Mbps), OC3 (155 Mbps), OC48 (2.5 Gbps), fiber optic cables, or LTE wireless access connection. In various embodiments, each of the communication networks 130A-130D may be connected to at least one other communication network via at least one Inter-ISP link 155. For example, communication network 130A may be connected to communication network 130B, 130C, and/or 130D via one or more inter-ISP links. Data may traverse more than one communications network along a path from first location 110 to second location 120. For example, traffic may flow from the first location 110 to communication network 130A, over inter-ISP link 155 to communication network 130B, and then to the second location 120.

The router 160 and first appliance 150 are optionally connected to the communication networks 130A-130D via access links 125, sometimes also referred to herein as network access links. The communication networks 130A-130D consist of routers, switches, and other internal components that make up provider links 135. The provider links 135 are managed by the network service providers such as an Internet Service Provider (ISP). The second location 120 can be connected to communication networks 130A-130D via destination access links 145. Access links 125, provider links 135, and destination access links 145 can be combined to make various network paths along which data travels between the first location 110 and the second location 120. The exemplary embodiment of FIG. 1 depicts two paths along various provider links 135 through each communication network. However, as understood by persons of ordinary skill in the art, there can be any number of network paths across one or more communication networks.

In addition, communication networks may be in communication with one another via inter-ISP link(s) 155. For example, data traveling through communication network 130A may also travel through communication network 130C before reaching second location 120. In various embodiments, data can travel through any one or more of the communication networks 130A-130D from first location 110 to second location 120, and vice versa. Generally, an inter-ISP link connects communication networks of different internet service providers, such as a link connecting Verizon LTE wireless network with Comcast broadband network. In some embodiments, an inter-ISP link can connect communication networks from the same internet service provider, such as a link connecting Verizon LTE wireless network with the Verizon Fire network.

The first appliance 150, along with any other appliances in system 100 can be physical or virtual. In the exemplary embodiment of a virtual appliance, it can be in a virtual private cloud (VPC), managed by a cloud service provider, such as Amazon Web Services, or others. An appliance in a customer data center can be physical or virtual. Similarly, the second location 120 may be a cloud service such as Amazon Web Service, Salesforce, or others.

As discussed herein, the communication networks 130A-130D can comprise multiple provider links, made up of routers and switches, connecting networked devices in different locations. These provider links, which together form various paths, are part of one or more core networks, sometimes referred to as an underlay network. In addition to these paths, there can also be tunnels connecting two networked devices. A virtual network, sometimes called an overlay network, can be used to transmit data across an underlay network, regardless of which Service Provider manages the routes or provider links. Data from connected devices can travel over this overlay network, which can consist of any number of tunnels or paths between each location.

In an exemplary embodiment, data from computers 140 at first location 110 may include voice, video, and data. This information can be transmitted by first appliance 150 over one or more communication networks 130A-130D to second location 120. In some embodiments, voice, video, and data may be received and transmitted on separate LAN or vLAN interfaces, and first appliance 150 can distinguish the traffic based on the LAN/vLAN interface at which the data was received.

In some embodiments, the system 100 includes one or more secure tunnels between the first appliance 150 and servers 170, or optionally a second appliance at the second location. The secure tunnel may be utilized with encryption (e.g., IPsec), access control lists (ACLs), compression (such as header and payload compression), fragmentation/coalescing optimizations, and/or error detection and correction provided by an appliance.

In various embodiments, first location 110 and/or second location 120 can be a branch location, central location, private cloud network, data center, or any other type of location. In addition, multiple locations can be in communication with each other. As understood by persons of ordinary skill in the art, any type of network topology may be used.

The principles discussed herein are equally applicable to multiple first locations (not shown) and to multiple second locations (not shown). For example, the system 100 may include multiple branch locations and/or multiple central locations coupled to one or more communication networks. System 100 may also include many sites (first locations) in communication with many different public web services (second locations). Branch location/branch location communication, central location/central location communication, central location/cloud appliance communication, as well as multi-appliance and/or multi-node communication and bi-directional communication are further within the scope of the disclosure. However, for the sake of simplicity, FIG. 1 illustrates the system 100 having a single first location 110 and a single second location 120.

Figure 2:
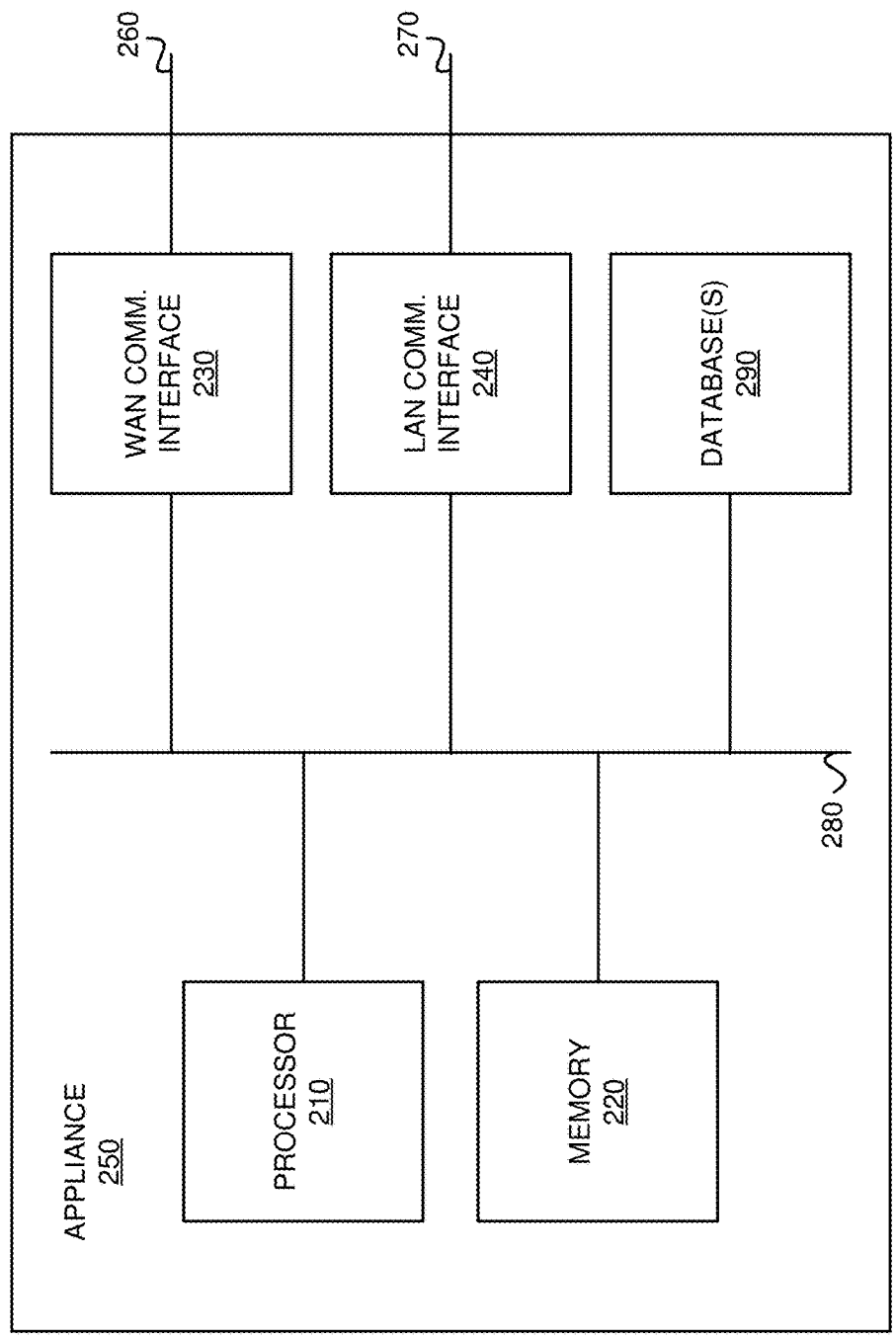
FIG. 2 illustrates a block diagram of an appliance, in an exemplary implementation of the invention.

FIG. 2 illustrates a block diagram of an appliance 250 (also referred to herein as network appliance), in an exemplary implementation of the invention. The appliance 250 includes a processor 210, a memory 220, a WAN communication interface 230, a LAN communication interface 240, and database(s) 290. A system bus 280 links the processor 210, the memory 220, the WAN communication interface 230, the LAN communication interface 240, and the database(s) 290. When deployed in a branch location, line 260 links the WAN communication interface 230 to the router 160 (in FIG. 1), and line 270 links the LAN communication interface 240 to the computers 140 in FIG. 1.

The database(s) 290 comprises hardware and/or software elements configured to store data in an organized format to allow the processor 210 to create, modify, and retrieve the data. The hardware and/or software elements of the database(s) 290 may include storage devices, such as RAM, hard drives, optical drives, flash memory, and magnetic tape.

In some embodiments, some appliances comprise identical hardware and/or software elements. Alternatively, in other embodiments, some appliances, such as a second appliance, may include hardware and/or software elements providing additional processing, communication, and storage capacity.

Embodiments of the present invention also allow for centrally assigned business intent policies to be implemented throughout an organization's entire network, to secure and control all WAN traffic for the organization. Software defined WAN (SD-WAN) overlay networks can be created independently from the physical network, and from each other, and in multiple layers. Topology, security, and forwarding rules can be specified independently for each overlay. This design allows for high-scale and secure application segmentation. Each overlay scales automatically as endpoints are added to the SD-WAN fabric, and configuration integrity is maintained as each site maps a local profile into a global overlay.

Figure 3:
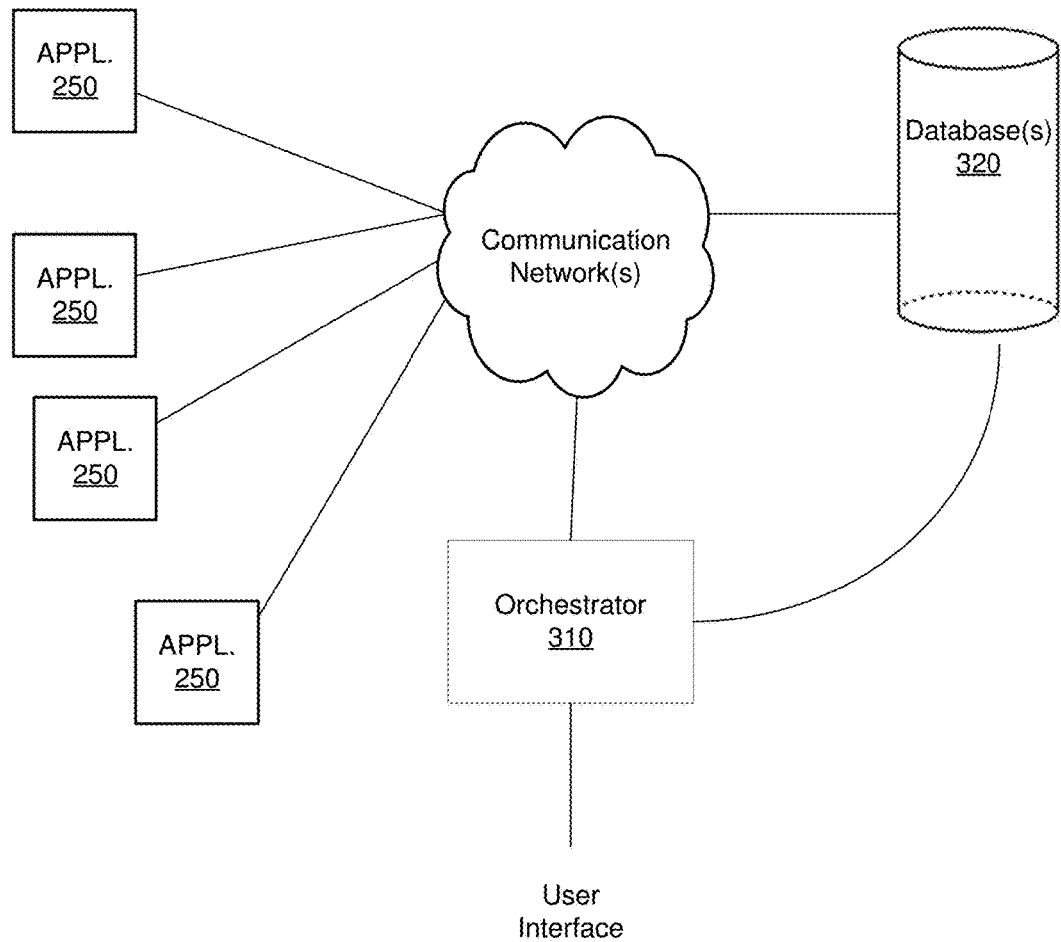
FIG. 3 depicts an exemplary system of an orchestrator device in communication with a plurality of appliances.

All of the overlay networks, labels, and corresponding ports, subnets and vLANs can be maintained in one or more databases in communication with an orchestrator device, as depicted in FIG. 3. The orchestrator 310 can be hardware and/or software, and be in communication with each of the networked devices, such as the network appliances, as well as in communication with the database(s) 320.

In exemplary embodiments, the orchestrator 310 may maintain information regarding the configuration of each appliance at each location (physical or virtual). In this way, the orchestrator 310 can create, manage and implement the business objectives for network traffic throughout the network of connected devices. For example, if a higher priority is designated for voice traffic, the orchestrator 310 can automatically configure the corresponding network appliances at all relevant locations accordingly.

By having knowledge of the configuration of each appliance in the network, the orchestrator 310 can also create and manage tunnels in the enterprise network, including tunnels to carry a particular type of network traffic between each source-destination appliance pair. The orchestrator 310 can automatically configure the enterprise network by determining which tunnels need to be set up, and automatically creating them based on the network nodes and overlays. The orchestrator 310 can also configure policies based on the application classification techniques described herein to preferentially steer certain types of applications over one path rather than over another path.

Figure 4:
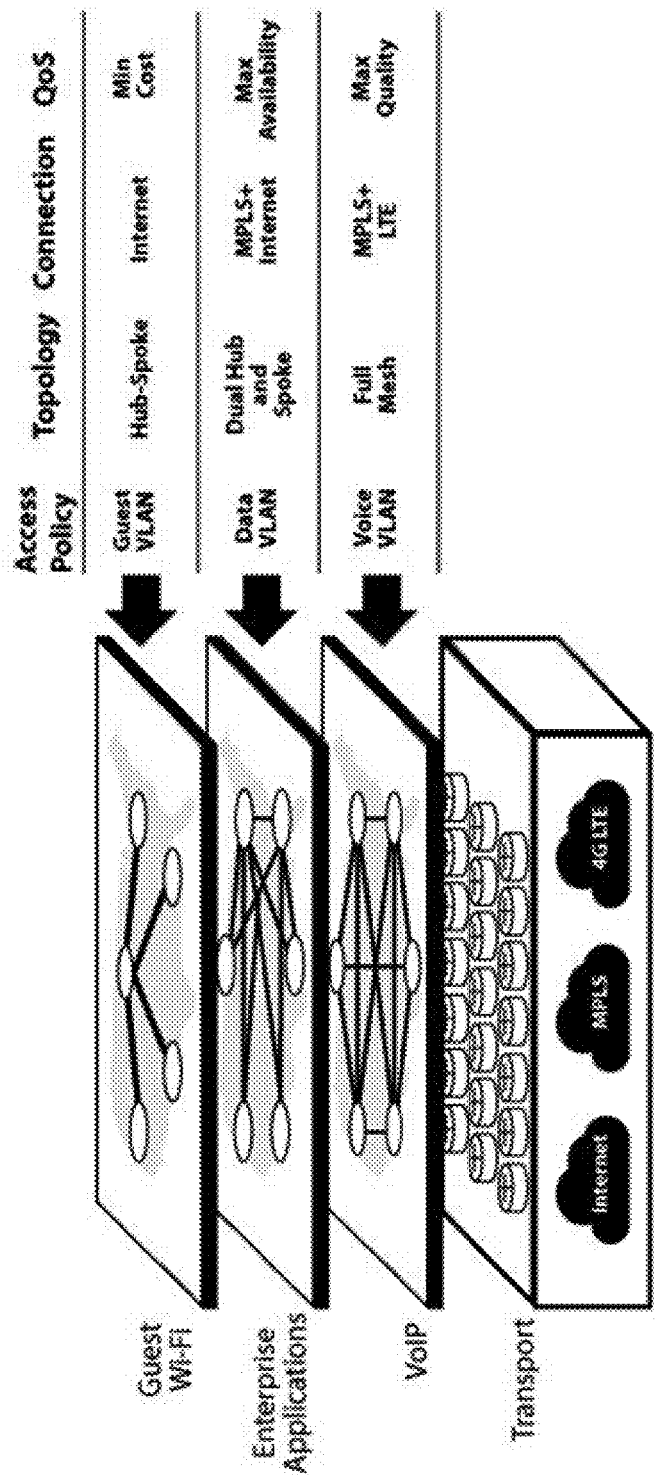
FIG. 4 illustrates an exemplary infrastructure serving individual needs of separate overlays.

FIG. 4 illustrates an exemplary infrastructure (physical MPLS, Internet and cellular networks) serving individual needs of separate overlays. In this case, there are three separate overlays for Guest Wi-Fi, Enterprise Application, and Voice over IP (VoIP). The overlays apply globally to the enterprise network, and the local profiles for each appliance describe how to map incoming traffic onto each overlay. While in this embodiment, vLAN is used as the access policy, other methods can be used such as access control lists, network interface, etc.

In the exemplary infrastructure of FIG. 4, different topologies and behaviors define the requirements of these applications. For instance, a business may not want the same topology for Customer Relationship Management (CRM) applications as for voice-over-IP (VoIP) applications. A dual hub and spoke configuration, with each of two data centers acting as hubs, could make sense for CRM, whereas VoIP typically would be configured in a full mesh to each destination.

Business intent overlays follow, and benefit from, the operational models of compute virtualization. They allow for maintenance of independence from the physical layer because the overlay decouples the delivery of business intent and applications from the vendor choice and hardware refresh cycle of the underlay (physical network of switches and routers). Furthermore, secure physical, virtual, and control networks are isolated because each overlay describes a logical network for the application that can have a different topology—including addressing and access control—from the physical network. In addition, high availability (HA) and ample bandwidth are facilitated via integration with route policies including dynamic path control (DPC) techniques that emphasize HA, maximum throughput or load balancing; applications are segmented according to required service-level guarantees such as minimum bandwidth or Quality of Service (QoS). Application visibility also provides full knowledge and control of all applications crossing the enterprise WAN with real-time graphs at the Layer 7 application level, including web services over HTTP(s).

In exemplary embodiments, network interfaces of a network appliance 250 can be designated on the WAN side and LAN side as processing a specific type of traffic, or traffic from specific applications. For example, a first WAN interface may connect to the public Internet, while a second WAN interface connects to an MPLS service. Both WAN interfaces can support encryption and the Internet uplink can be configured for Network Address Translation (NAT).

For example, an organization may prefer that voice traffic be transmitted over MPLS. The orchestrator 310 knows how to identify voice traffic at each location and which interfaces at each appliance 250 in every location use MPLS, so the orchestrator 310 can automatically configure every appliance to direct voice traffic over the MPLS communication network, regardless of which LAN or WAN port of the network appliance 250 MPLS is connected.

II. Steering Network Traffic

Oftentimes, the determination of which communication network to use to transfer packets of a particular flow must be made on the first packet of the flow. Because there are multiple network paths (including different networks and overlay tunnels) for transmitting data, traffic needs to be steered in a WAN. In many cases, once a flow transmission begins over a particular network path, all packets of the flow need to be transmitted over the same path.

Figure 5:
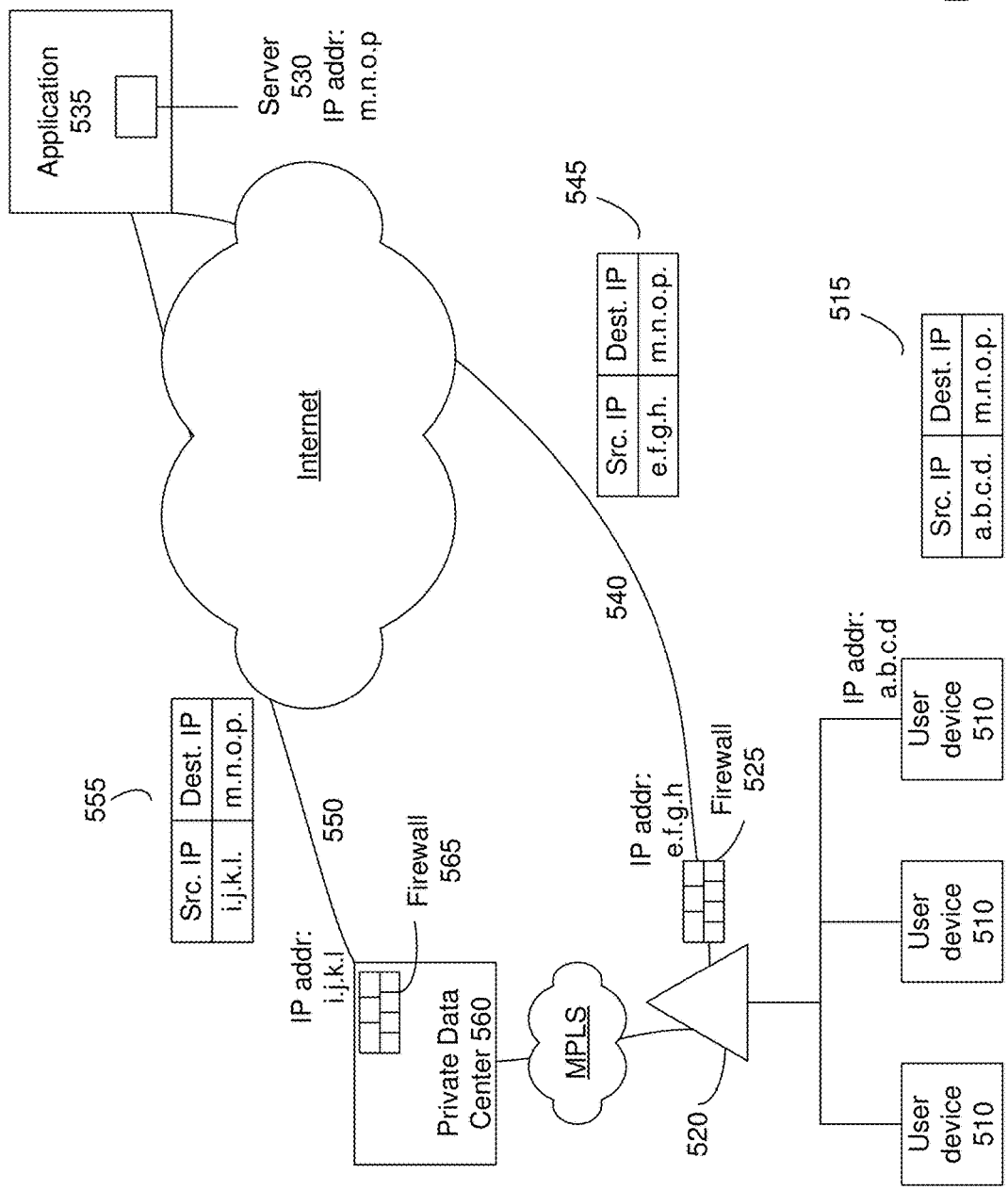
FIG. 5 depicts an exemplary environment for a user to connect to an application.

In an exemplary environment of FIG. 5, one or more user computing devices 510 are connected to a network appliance 520, also sometimes referred to herein as simply appliance 520. In the exemplary environment, the appliance 520 is connected to an MPLS network and an Internet network. A user computing device 510 may initiate a connection to an application 535 that is hosted by server 530. Server 530 is also sometimes referred to herein as application server 530. Typically, the application 535 can be any application that is accessible from the public Internet, such as any website, but the present disclosure is not limited to that embodiment. Application 535 can comprise an entire application, or simply a part of an application. That is, application 535 can be hosted by a single server, or by a combination of servers. Each server may be physical or virtual, and each server may be in a different geographic locations. For example, in one embodiment, application 535 may provide a web-based email service hosted by a single server. In another embodiment, application 535 may provide a news aggregation service, with news articles provided by multiple servers located in different geographic locations.

Based on the IP address of server 530 that is hosting application 535, and/or the location of server 530, embodiments of the present disclosure provide for an inference to be made as to the name of the application 535 hosted by server 530. For example, by learning which destination server IP addresses are associated with which application names, the name of application 535 can be inferred in the future from the destination server IP address in a data packet transmitted by user computing device 510 to initiate a connection with application 535.

While the exemplary environment of FIG. 5 depicts just one server 530 for the application 535, there can actually be many physical or virtual servers at a geographic location hosting the application 535. Furthermore, while not depicted here, there can be any number of additional network components present, such as load balancers, routers, switches, firewall, etc. There may also be layers of address translation inside a data center hosting application 535, such that the apparent server IP address for server 530 appears different publicly than internally inside the second location. For simplicity a single server 530 is described here with a single public IP address. However, a person of ordinary skill in the art will understand that the single server scenario depicted herein can be generalized to more complicated scenarios involving multiple servers.

The user request to access the application 535 hosted at the location may be routed by appliance 520 directly through the Internet, or through an MPLS network to private data center 560 first, and then over the Internet. There may additionally be one or more firewalls along either path.

The traffic originating from user computing device 510 may have a private source IP address such as a.b.c.d, and a destination IP address for server 530 of m.n.o.p., as shown in table 515 of FIG. 5. However, the appliance 520 and/or the firewall 525 may perform network address translation to alter the source IP to a different address such as e.f.g.h. While firewall 525 is depicted as being external to appliance 520, it may actually be internal to appliance 520 in some embodiments. If the data traffic is routed over path 540 to application server 530, then the flow between user computing device 510 and application server 530 will appear to the application server 530 as having an apparent source IP address of e.f.g.h and a destination IP address of m.n.o.p., as depicted in table 545 of FIG. 5.

In another embodiment, the data traffic from user computing device 510 to application server 530 is routed through the MPLS network first to a private data center 560. A firewall 565 in the private data center 560 may perform network address translation to a different source IP address, such as i.j.k.l. This network address translation could be performed by a firewall appliance, a server, a router or other device. Thus, the data traffic routed over path 550 to application server 530 will have an apparent source IP address of i.j.k.l at the application server 530 and a destination IP address of m.n.o.p., as shown in table 555 of FIG. 5. In this way, even though the user computing device 510 originating the flow is the same, the application server 530 views incoming traffic from path 540 as being different from incoming traffic from path 550 since the source IP address for traffic arriving on path 540 is different from the source IP address for traffic arriving on path 550.

Because of the network address translation, if a first packet of a flow is transmitted by appliance 520 to application server 530 over path 540, but a second packet of the same flow is transmitted by appliance 520 to application server 530 over path 550, the server will not recognize the two packets as belonging to the same flow. This can become problematic if, for example, a TCP handshake is conducted over path 540 and data traffic is transmitted over path 550. Thus, appliance 520 needs to select an appropriate network path for transmitting data from user computing device 510 to application server 530, such that the same network path is used for all packets of a given flow.

When steering traffic by appliance 520, a determination of which network path to take needs to be made on the first packet for each flow, as once traffic has started in one direction, the appliance 520 generally cannot change directions for the traffic flow. The selection of network path can be based on traffic type, name of application 535, destination IP address of the server 530, or any other such criteria. However, often a first packet is used to establish a connection between the two devices (such as a TCP SYN packet), and does not have much (if any) other information besides simply header information. There may be no explicit information about traffic type or application name in the information in a first packet. As a result, these characteristics need to be inferred from the limited information that is available in the information in the first packet for the flow.

In exemplary embodiments of the present disclosure, a neural network or other such learning algorithm may be used by an appliance 250 to infer an application name and/or one or more application characteristics or "tags" from the limited information in a first packet of a flow. As used herein, an application characteristic may be any characteristic or property related to an application or traffic type. The characteristic may have multiple possible values of the key. For example, an application characteristic can be "safety" which represents the safety of the network traffic. This can have multiple key values, such as "very safe", "safe", "unsafe", "dangerous", etc. Furthermore, a "tag" as used herein may comprise a specific string, such as "safe", or "unsafe". In this way, a "tag" may represent a value of a "characteristic", or be independent from a characteristic.

Figure 6:
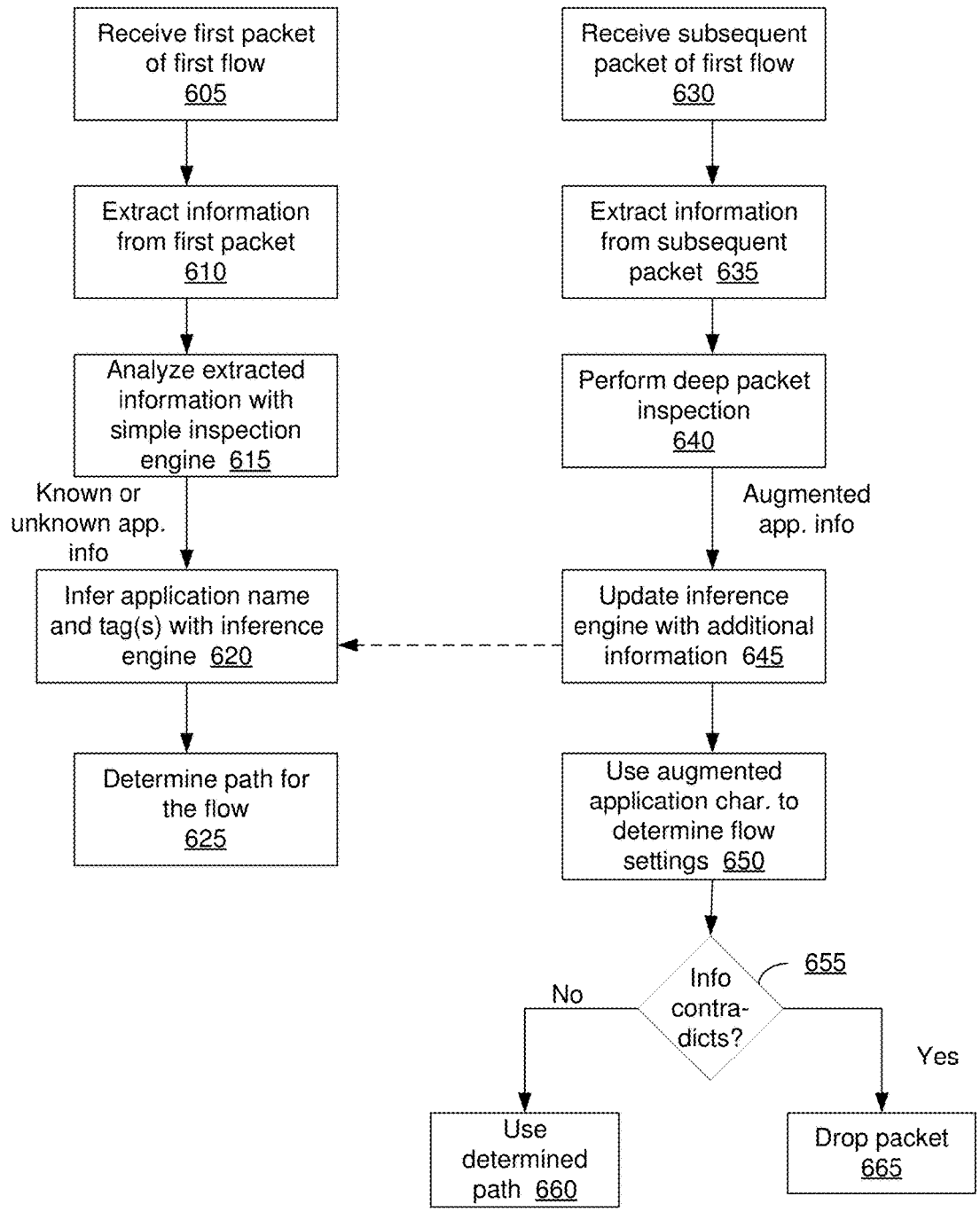
FIG. 6 depicts an exemplary method undertaken by network appliance in steering traffic.

FIG. 6 depicts an exemplary method undertaken by network appliance 250 in steering traffic. In step 605, appliance 250 receives a first packet of a new flow. The appliance 250 then extracts information from the first packet in step 610 using a feature extraction engine. As discussed herein, the first packet may contain only header information if it is, for example, a TCP SYN packet. In other embodiments, the first packet may have more than just header information. In any case, the extraction engine of appliance 250 extracts the information available from the first packet for the flow. A simple inspection engine 710 is used to analyze the extracted information in step 615. A determination is made whether this information is indicative of known application names and/or one or more tags. An inference engine 720 is then used to infer an application name and one or more application tags in step 620.

If the extracted information is indicative of known application names and/or tags, then the inference engine 720 uses the known mapping to classify the flow as belonging to the known application name and/or application tags or characteristics. If the extracted information is partially indicative of known application names and/or tags, or is not indicative of any known application names and/or tags at all, then an inference is made as to the application name associated with the flow and/or one or more application tags or characteristics. In some embodiments, the inference engine 720 is unable to make any inference as to application name and/or tag(s) and returns a value of "unknown". In various embodiments, a confidence percentage can be used by appliance 250 for the simple inspection engine 710 and/or the inference engine 720. For example, the engines may need to determine an application name and/or tag with a predetermined level of confidence before selecting that application name and/or tag as corresponding to the data in the packet being analyzed. The predetermined confidence level can be preset or be variable for different appliances, application names, tags/characteristics, enterprises, or based on time.

Once appliance 250 determines the application name and/or tag(s) via inference engine 720, appliance 250 determines a network path over which to transmit the flow in step 625. The selection of a path can be based on any number of factors. For example, appliance 250 may have a policy that all voice over IP traffic should be routed over an MPLS network while data traffic is routed over the public Internet. A determination from the inference engine 720 aids the appliance 250 in determining which path to use for the flow. In some embodiments, if the inference engine 720 is unable to make an inference, then a default path may be selected.

When the appliance 250 receives a second packet of the same flow in step 630, the second packet may continue to be routed over the chosen path for the first packet. However, appliance 250 may still analyze and extract information from the second packet to improve the learning and inference of the inference engine 720. Thus information can be extracted from the subsequent packet in step 635. Typically the subsequent packet may contain more information than was present in the first packet of the flow, and thus more information can be gleaned from this packet. Furthermore, information can be gleaned from a combination of data packets, and not simply a singular packet. That is, there may be data, such as an embedded domain name, that spans across multiple packet boundaries. For example, one packet may have "www.go" embedded within it, while a subsequent packet has "ogle.com" embedded within it. The domain name can be gleaned from a combination of the information in the two packets. While only two packets are discussed here, information can be gleaned from a combination of any number of packets.

Deep packet inspection, using any of the known methods, can be performed on the extracted information from the subsequent packet in step 640. The deep packet inspection will typically yield additional information about the application for which the flow is destined. This additional information can be useful for other future flows, such as FTP (File Transfer Protocol) control channel or DNS (Domain Name Server) queries. This additional information might not change the direction of routing for the current flow, but rather inform how future flows are handled. In some embodiments, the deep packet inspection may find that the inferred application name and/or one or more inferred application tags or characteristics originally determined by the inference engine 720 for the first packet in step 620 was incorrect. The information is passed on to the inference engine 720 in step 645.

In other embodiments, the deep packet inspection may find that the inferred application and/or inferred tags originally determined for the first packet in step 620 was correct, but additional application characteristics or tags are gleaned from the deep packet inspection. This augmented information is passed on to the inference engine 720 in step 645 while traffic continues to be routed over the selected path for the flow. In step 650, the augmented application characteristics can be used to determine flow settings, such as quality of service or flow prioritization.

In step 655, a determination is made by appliance 250 whether the augmented information gleaned from a subsequent packet contradicts the original inference. Additionally, a confidence level for the contradiction may be determined, such that the augmented information can contradict the original inference on a sliding scale from strong to weak. If there is no contradiction, then the subsequent packet continues to be routed 660 over the path determined in step 625. If there is a contradiction with a low level of confidence, then the subsequent packet continues to be routed over the path determined in step 625. If there is a contradiction with a high level of confidence, then the appliance 250 may drop the packet 665 and optionally reset the connection (e.g., with a RST packet). In alternate embodiments, if there is a contradiction with a high level of confidence in step 665, appliance 250 may decide to route further packets on a new path associated with the augmented information, thus changing direction mid-flow. The destination server may not recognize the packets from the different path and reset the connection automatically.

It will be understood that where the term second packet is used herein, the process applies to any subsequent packet in the flow, regardless of whether it is actually chronologically the second, third, tenth, or any later packet. Further, the deep packet inspection may be performed for only one subsequent packet of a flow, or for multiple subsequent packets of a flow. In this way, a learning algorithm at the inference engine 720 is continually updated such that the inference made on the first packet can continue to be refined and the optimal path can be chosen for a given flow based only on limited information in the first packet of the flow.

In an exemplary environment such as FIG. 5, appliance 250 receives traffic destined for application server 530. Based on information in the first packet (source IP a.b.c.d, destination IP m.n.o.p and TCP protocol), and observations of past history of flows with similar information, the appliance 520 may infer that this flow is for a particular application 535 hosted at server 530 and has a tag of "data" for file transfer traffic. Consequently, appliance 250 may choose to transmit data via network path 540.

A subsequent packet of the same flow may contain information to determine that the flow is actually streaming video and thus the tag should have been "video" and not "data". Thus, the traffic type classification inferred by appliance 520 from the first packet was incorrect, and updates are made by the learning algorithm such that a subsequent flow with similar extracted information from the packet is classified as being streaming video traffic and not data traffic. In some embodiments, an incorrect classification may be detected a certain number of times before the learning algorithm alters the application inference or one or more application tags inferred on the first packet.

In other embodiments, information such as timestamp may be used in conjunction with extracted information to infer an application and/or tags. For example, appliance 520 may determine that every Tuesday at 10 am, user computing device 510 initiates a VoIP call. Thus traffic from a.b.c.d at that time is for VoIP, whereas at other times it is data. Upon observing traffic flows in this way, a distributed deep learning algorithm can determine patterns for traffic flowing through appliance 520 and use these patterns to better classify and infer data traffic flows from only information present in a first packet for each flow.

Figure 7:
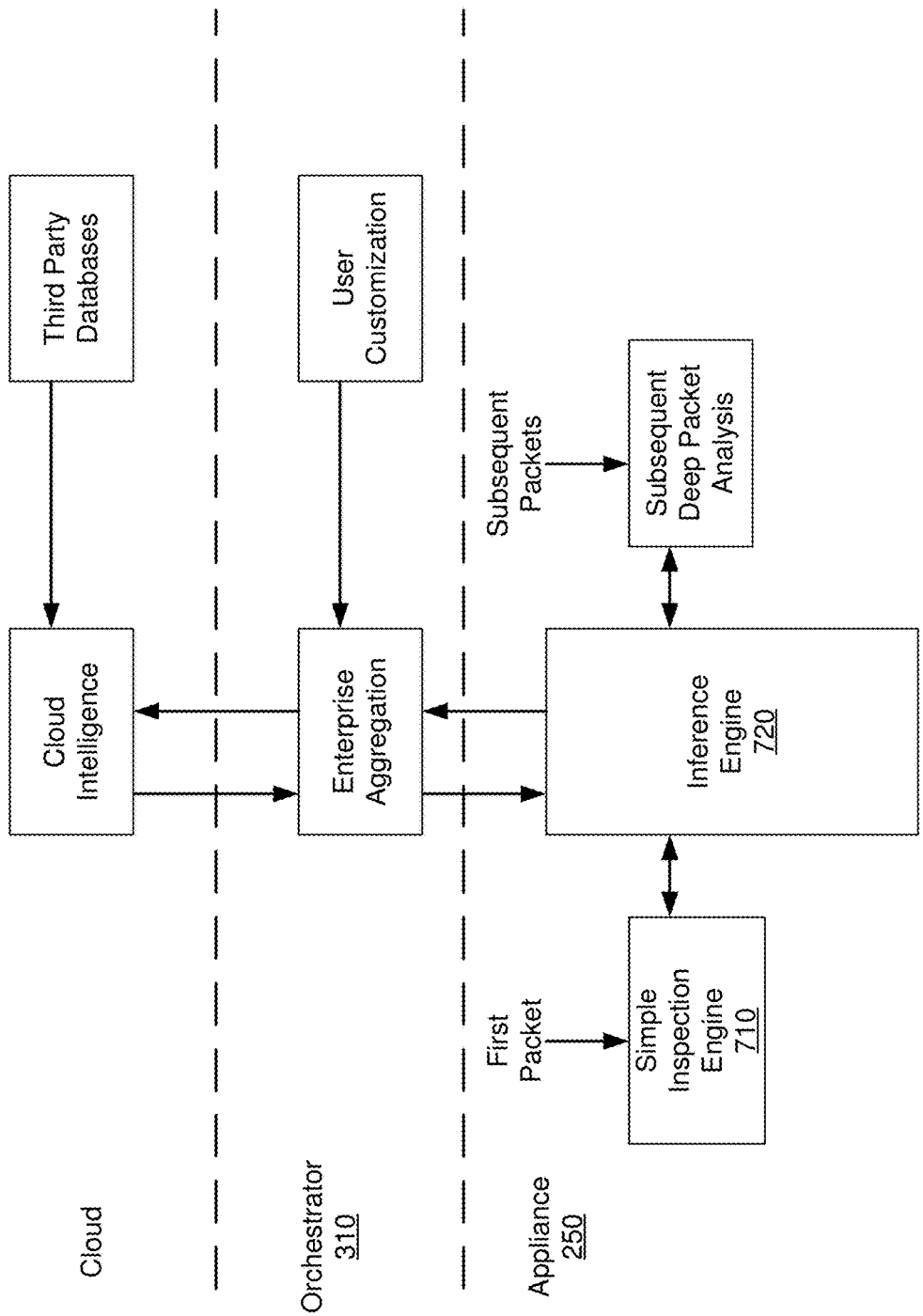
FIG. 7 depicts an exemplary system for aggregating inference information.

In various embodiments, the inference engine at an appliance 250 can be in communication with other databases to help refine the inference made on the first packet. As depicted in FIG. 7, the inference engine 720 at every appliance 250 in the overlay network can be in communication with the orchestrator 310, which manages all of the appliances at a given enterprise. For example, if an enterprise has multiple network appliances deployed in various locations of its WAN, information from all of the inference engines at each appliance can be aggregated over the enterprise and be maintained by one or more data structures (such as a database) at the orchestrator 310 to provide more data points for the distributed deep learning algorithm and perform more accurate classification on the first packet. Furthermore, machine learning can be used at the orchestrator 310 to combine information received from the network appliances in the network.

In addition, a user such as a network administrator can customize the inference for a particular set of packet information such that flows are classified in a particular manner. In this way, the learning algorithm in a particular network appliance can be informed by data inspected through that one appliance and also by data inspected at other appliances throughout the enterprise.

Further, information from multiple enterprise orchestrators can be aggregated in a cloud-based system, along with information from third party databases, to better inform the distributed deep learning algorithm of the neural network and allow each network appliance 250 to perform more accurate classification and inference on the first packet for various flows.

Similarly, information from the cloud intelligence can be communicated to an orchestrator 310, which in turn can be relayed to an appliance 250 at a location. In this way, an inference engine 720 at an appliance at one location can have the benefit of data points from multiple appliances, orchestrators, and third party databases, to aid in its inference. The cloud-based system can also use machine learning techniques applied to the data it receives from different sources. The cloud-based system can determine and evaluate trends across multiple orchestrators (and hence enterprises) and distribute classification and inference information back to each orchestrator 310 and appliance 250.

Figure 8:
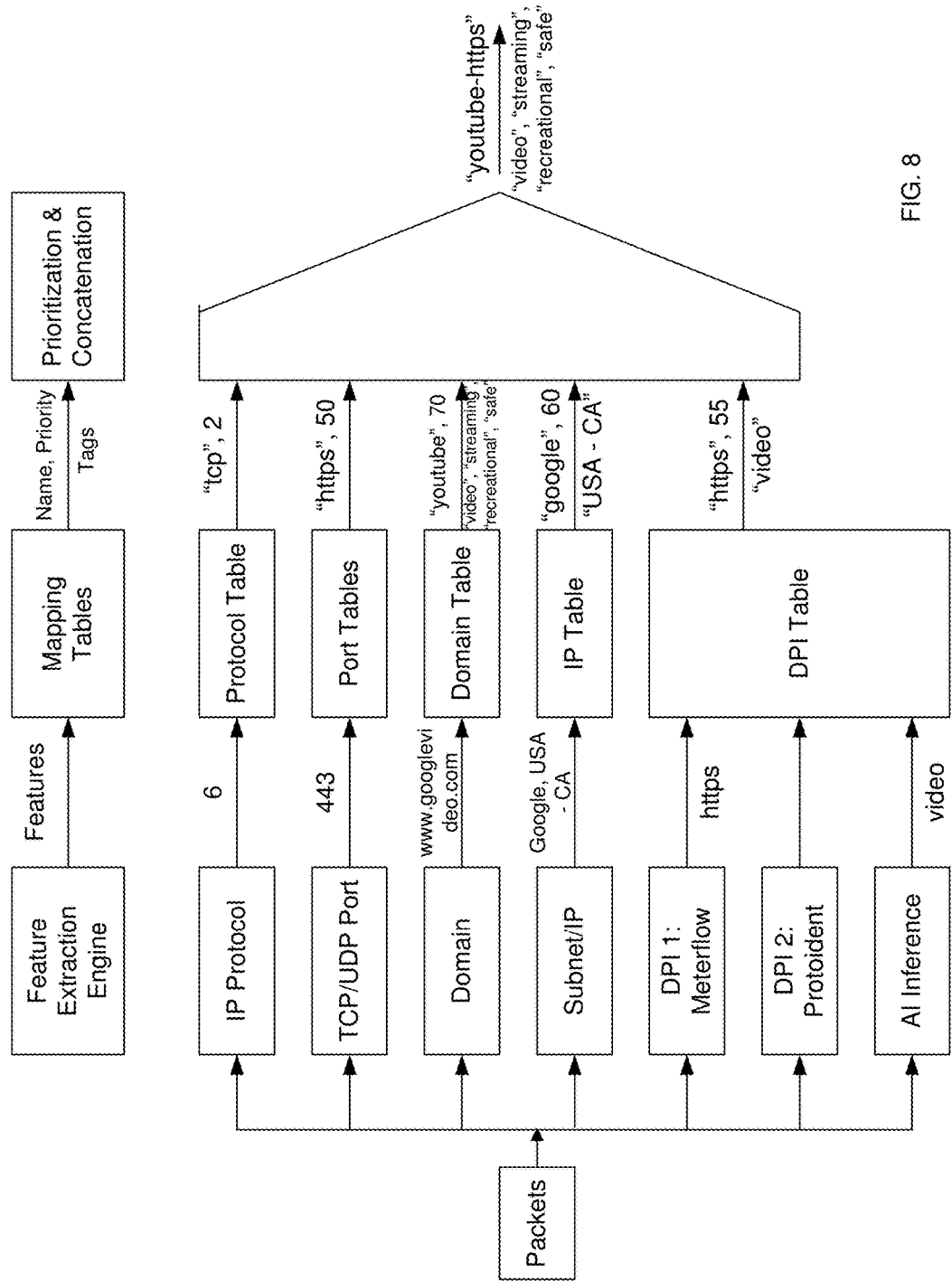
FIG. 8 depicts an exemplary analysis that is conducted on packet information to classify a flow.

FIG. 8 depicts an exemplary analysis that is conducted on packet information to classify a flow. Information from a packet is extracted by a feature extraction engine. The feature extraction engine may extract information such as IP protocol, TCP/UDP port, domain name, subnet/IP, any result from deep packet inspection methods, and an artificial intelligence inference. While these specific features are shown in FIG. 8, a person of ordinary skill in the art would understand that there can be a different set of features or fewer or additional features extracted for any given packet.

A first packet for a flow may only have a few features available, such as IP protocol, TCP/UDP port, and subnet/IP. A subsequent packet for the flow, or combination of subsequent packets, may have one or more additional features that can be extracted, such as an embedded destination domain name. As discussed above, the domain name or other information may span across multiple packets.

From the extracted features, mapping tables are used to map each feature to an application name, priority, and/or one or more tags for the flow. For example, a mapping table may determine that an IP protocol of 6 is for TCP data with a priority of 2. A mapping table may further determine that a port of 443 is for https traffic with a priority of 50. A further mapping table may determine that googlevideo.com is for the application name YouTube, which has a priority of 70 and tags of "video", "streaming", "recreational", and "safe".

From these mapped values, the highest priority mapped value may be determined to represent the flow by a prioritization and concatenation engine. In the exemplary embodiment of FIG. 8, the highest priority is 70 and it is indicative of the application "YouTube" with tags of "video", "streaming", "recreational" and "safe". Further, the concatenation engine may also determine that the traffic uses https, and so an application name of "YouTube-https" is determined for the flow. In various embodiments, a characteristic can comprise a key-value pair. For example, "traffic type: video", "business relevance: high", "business relevance: personal".

In various embodiments, the feature extraction process may be performed on a first packet for a flow and/or on one or more subsequent packets for the same flow. FIGS. 9-13 depict exemplary mapping tables that can be used in this analysis.

In various embodiments, a domain name and/or subnet can be inferred from an IP address. A DNS table may be consulted with information regarding corresponding domain names and IP addresses. However, since there are many IP addresses in different addressing system, maintaining a local DNS table for every possible IP address is cumbersome. In some embodiments, caching or other similar methods can be used to maintain a subset of DNS information in a location accessible by a network appliance.

In another embodiment, a map can be maintained and distributed from a portal in the orchestrator to all appliances. The map may contain information such as a range of IP addresses or a subnet, the organization/owner of that range, and a geolocation for that range. For example, IP addresses from 0 to X1-1 may correspond to Company A located in San Francisco, Calif. IP addresses from X1 to X2-1 may correspond to Company B located in Chicago, Ill. IP addresses from X2 to X3-1 may correspond to Company C located in Miami, Fla. In this way, a subnet/IP can be inferred from a single IP address.

In a third embodiment, DNS snooping can be used to determine a mapping from a domain name to an IP address. A DNS server may be located in the private data center, at the application 535, or at any other location in the network. When a user computer, such as the user computing device 510 of FIG. 5, sends a request to the DNS server for the IP address associated with a domain name or website, the DNS server responds with the IP address and domain name. The appliance, such as appliance 520 of FIG. 5, can intercept the DNS response to user computing device 510 and create a cached table such that the information is available for future requests to that domain name. Further, this information can be aggregated across all appliances in the enterprise network and maintained in a central location such as in the orchestrator.

In a fourth embodiment, deep packet inspection methods can be used to determine the domain name. For example, a first packet for a flow may have only header information. However, a fourth packet may have information about the destination domain name in the payload of the packet. Thus, deep packet inspection methods can yield the domain name associated with the destination IP address in the header. This information can be aggregated across all appliances and maintained in a central location such as in the orchestrator.

Thus, methods and systems for multi-level learning for classifying traffic flows are disclosed. Although embodiments have been described with reference to specific examples, it will be evident that various modifications and changes can be made to these example embodiments without departing from the broader spirit and scope of the present application. Therefore, these and other variations upon the exemplary embodiments are intended to be covered by the present disclosure. Accordingly, the specification and drawings are to be regarded in an illustrative rather than a restrictive sense.

What is claimed is:

1. A method of selecting a network path for transmitting data across a network, the method comprising:
   receiving at a first network appliance, a first packet of a first flow to be transmitted across a network;
   extracting information from the first packet;
   using an application inference engine influenced by a learning algorithm to infer at least one of an application name and one or more application tags for the first flow based on the extracted information;
   selecting by the first network appliance, a network path based on the inferred at least one of application name and one or more application tags; and
   transmitting the first flow by the first network appliance via the selected network path to a destination.

2. The method of claim 1, wherein the first packet comprises only header information.

3. The method of claim 1, wherein the destination is a second network appliance.

4. The method of claim 1, wherein the destination is a server associated with an application.

5. The method of claim 1, further comprising:
performing network address translation based on the selected network path to change at least one of a source network address and a source port in packets of the first flow.

6. A method of training an inference engine to identify at least one of an application and one or more application characteristics for a flow, the method comprising:
receiving at a first network appliance, a first packet of a first flow to be transmitted across a network, wherein the network comprises a plurality of network paths;
extracting information from the first packet;
using an application inference engine influenced by a learning algorithm to infer at least one of an application name and one or more application characteristic tags based on the extracted information from the first packet;
selecting by the first network appliance, a network path from the plurality of network paths in the network for transmitting the first flow, the network path selected based on at least one of the inferred application name and inferred one or more application characteristic tags; and
transmitting by the first network appliance, the first flow via the selected network path to a destination.

7. The method of claim 6, wherein the extracted information from the first packet comprises at least one of a source IP address, a destination IP address, a source port, a destination port, and a protocol.

8. The method of claim 6, wherein the one or more application characteristic tag comprises a traffic type.

9. The method of claim 6, wherein the application inference engine comprises a neural network.

10. The method of claim 6, further comprising:
receiving at least one subsequent packet for the first flow;
extracting information from the received at least one subsequent packet;
using an inspection engine to determine at least one of an application name and one or more application characteristic tags based on the extracted information from the received at least one subsequent packet; and
informing the application inference engine with additional information such that the information from the received at least one subsequent packet is associated with the determined application name and at least one application characteristic tags for a subsequent flow.

11. The method of claim 10, wherein the additional information confirms the inference.

12. The method of claim 10, wherein the additional information contradicts the inference.

13. The method of claim 10, wherein the extracted information from the received at least one subsequent packet comprises at least one of a source IP address, a destination IP address, a source port, a destination port, a protocol, a domain name, and application data.

14. The method of claim 10, wherein the extracted information from the received at least one subsequent packet is analyzed using deep packet inspection.

15. The method of claim 10, further comprising:
receiving at the network appliance, a first packet of a second flow to be transmitted across the network;
using the application inference engine to determine an application name and at least one tag associated with the second flow;
selecting by the network appliance, a preferred network path for the second flow based on the determined application name and at least one tag associated with the second flow; and
transmitting by the network appliance, the second flow via the preferred network path.

16. A system for inferring at least one of an application name and one or more application tags for a first packet of a flow, comprising:
a feature extraction engine comprising a processor and memory, configured to extract information from the first packet of the flow;
an inspection engine comprising the processor and the memory, configured to determine whether the extracted information is indicative of a known application name or one or more application tags; and
an inference engine comprising the processor and memory, configured to infer at least one of an application name and one or more known application tags for the first packet based on the extracted information.

17. The system of claim 16, wherein the inference engine uses a learning algorithm of a neural network.

18. The system of claim 16, wherein the extracted information from the first packet comprises at least one of a source IP address, a destination IP address, a source port, a destination port, and a protocol.

19. The system of claim 16, wherein the extracted information from the first packet comprises at least one of a source IP address, a destination IP address, a source port, a destination port, a protocol, a domain name, and application data.

20. The system of claim 16, wherein the one or more application tags comprises at least one of voice, video, and data.

* * * * *